(12) United States Patent
Wang et al.

(10) Patent No.: US 12,090,729 B2
(45) Date of Patent: Sep. 17, 2024

(54) GLASS ASSEMBLY INCLUDING AN OPAQUE BOUNDARY FEATURE AND METHOD OF MANUFACTURING THEREOF

(71) Applicant: AGC Automotive Americas Co., Alpharetta, GA (US)

(72) Inventors: Jiangping Wang, Novi, MI (US); Timothy D. Peck, White Lake, MI (US); Samuel Thomas Machi, Belleville, MI (US); Brandon Jones, Ypsilanti, MI (US)

(73) Assignee: AGC Automotive Americas Co., Alpharetta, GA (US)

( * ) Notice: Subject to any disclaimer, the term of this patent is extended or adjusted under 35 U.S.C. 154(b) by 40 days.

(21) Appl. No.: 17/860,488

(22) Filed: Jul. 8, 2022

(65) Prior Publication Data

US 2024/0009968 A1    Jan. 11, 2024

(51) Int. Cl.
*B32B 17/10* (2006.01)
*B32B 37/24* (2006.01)
(Continued)

(52) U.S. Cl.
CPC .. *B32B 17/10266* (2013.01); *B32B 17/10036* (2013.01); *B32B 17/10293* (2013.01);
(Continued)

(58) Field of Classification Search
CPC ........... C03C 2218/32; C03C 2218/119; C03C 17/42; C03C 17/32; C03C 17/001;
(Continued)

(56) References Cited

U.S. PATENT DOCUMENTS

| 3,444,732 A | 5/1969 | McKinley et al. |
| 4,668,270 A | 5/1987 | Ramus |

(Continued)

FOREIGN PATENT DOCUMENTS

| CN | 106335291 A | | 1/2017 | |
| CN | 112159082 A | * | 1/2021 | ............. B32B 17/06 |

(Continued)

OTHER PUBLICATIONS

CN 106335291 A, Jan. 18, 2017, Machine-Assisted English Translation.

(Continued)

*Primary Examiner* — Vishal I Patel
(74) *Attorney, Agent, or Firm* — Howard & Howard Attorneys PLLC

(57) ABSTRACT

A method of manufacturing a glass assembly to have an opaque boundary feature includes a step of forming a first glass substrate that is curved, with the first glass substrate having an outer surface (P1) and an opposing inner surface (P2), and a second glass substrate that is curved, with the second glass substrate having an inner surface (P3) and an opposing outer surface (P4). The method also includes a step of digitally-applying an organic ink without a mask on at least one of the P2 surface and the P3 surface. The method further includes curing the organic ink to form the opaque boundary feature on at least one of the P2 surface and the P3 surface. The method also further includes disposing a polymeric interlayer between the P2 surface and the P3 surface.

27 Claims, 14 Drawing Sheets

(51) Int. Cl.
  *B32B 38/00* (2006.01)
  *C03C 17/00* (2006.01)
  *C03C 17/32* (2006.01)
  *C03C 17/42* (2006.01)

(52) U.S. Cl.
  CPC .. *B32B 17/10348* (2013.01); *B32B 17/10935* (2013.01); *B32B 37/24* (2013.01); *B32B 38/145* (2013.01); *C03C 17/001* (2013.01); *C03C 17/32* (2013.01); *C03C 17/42* (2013.01); *B32B 2037/243* (2013.01); *B32B 2250/03* (2013.01); *B32B 2255/20* (2013.01); *B32B 2255/26* (2013.01); *B32B 2255/28* (2013.01); *B32B 2307/41* (2013.01); *B32B 2307/412* (2013.01); *B32B 2310/0831* (2013.01); *B32B 2315/08* (2013.01); *B32B 2605/006* (2013.01); *B32B 2605/08* (2013.01); *C03C 2218/119* (2013.01); *C03C 2218/32* (2013.01)

(58) Field of Classification Search
  CPC .......... B32B 2605/08; B32B 2605/006; B32B 2315/08; B32B 2310/0831; B32B 2307/412; B32B 2307/41; B32B 2255/28; B32B 2255/26; B32B 2255/20; B32B 2250/03; B32B 2037/243; B32B 38/145; B32B 37/24; B32B 17/10935; B32B 17/10293; B32B 17/10036; B32B 17/10266
  See application file for complete search history.

(56) References Cited

U.S. PATENT DOCUMENTS

| | | | |
|---|---|---|---|
| 4,744,844 A | 5/1988 | Hurst | |
| 4,786,784 A | 11/1988 | Nikodem et al. | |
| RE33,297 E | 8/1990 | Ramus et al. | |
| 5,565,237 A | 10/1996 | Bartetzko | |
| 6,602,371 B2 | 8/2003 | Veerasamy | |
| 7,132,625 B2 | 11/2006 | Voeltzel | |
| 7,727,634 B2 | 6/2010 | Yacovone | |
| 7,803,221 B2 | 9/2010 | Magdassi et al. | |
| 7,955,470 B2 | 6/2011 | Kapp et al. | |
| 7,955,696 B2 | 6/2011 | Baikerikar et al. | |
| 8,022,333 B2 | 9/2011 | Maeuser | |
| 9,011,628 B2 | 4/2015 | Elwakil et al. | |
| 9,090,120 B2 | 7/2015 | Pires et al. | |
| 9,158,172 B2 | 10/2015 | Sbar et al. | |
| 9,434,132 B2 | 9/2016 | Van Duffel et al. | |
| 9,556,071 B2 | 1/2017 | Finley et al. | |
| 9,623,634 B2 | 4/2017 | McKinley et al. | |
| 9,630,396 B2 | 4/2017 | Orr | |
| 9,790,388 B2 | 10/2017 | Wang et al. | |
| 9,986,669 B2 | 5/2018 | Uprety et al. | |
| 10,232,592 B2 | 3/2019 | Loccufier et al. | |
| 10,278,237 B2 | 4/2019 | Krause et al. | |
| 10,374,330 B1 | 8/2019 | Bennett et al. | |
| 10,420,210 B2 | 9/2019 | Uprety et al. | |
| 10,549,508 B2 | 2/2020 | Cloots et al. | |
| 10,553,964 B2 | 2/2020 | Bennett et al. | |
| 10,752,782 B2 | 8/2020 | Loccufier | |
| 10,792,955 B2 | 10/2020 | Ito et al. | |
| 10,819,002 B2 | 10/2020 | Zhu et al. | |
| 10,843,497 B2 | 11/2020 | Minamidate et al. | |
| 10,882,780 B2 | 1/2021 | Conti et al. | |
| 11,027,528 B2 | 6/2021 | Laluet et al. | |
| 11,031,671 B2 | 6/2021 | Xia et al. | |
| 11,075,450 B2 | 7/2021 | Yong et al. | |
| 11,097,978 B2 | 8/2021 | Hori et al. | |
| 11,130,314 B2 | 9/2021 | Yoon et al. | |
| 11,260,629 B2 | 3/2022 | Cleary et al. | |
| 11,279,108 B2 | 3/2022 | Bard et al. | |
| 11,362,473 B2 | 6/2022 | Yeh | |
| 11,654,751 B2 | 5/2023 | Wetzel et al. | |
| 11,679,597 B2 | 6/2023 | Büstgens | |
| 11,752,778 B2 | 9/2023 | Hasegawa | |
| 2008/0206504 A1 | 8/2008 | Hayes et al. | |
| 2008/0233371 A1 | 9/2008 | Hayes et al. | |
| 2008/0286542 A1 | 11/2008 | Hayes et al. | |
| 2010/0098917 A1 | 4/2010 | Lyon | |
| 2013/0258436 A1 | 10/2013 | Podbelski et al. | |
| 2015/0101849 A1 | 4/2015 | Bockmeyer et al. | |
| 2015/0375246 A1* | 12/2015 | Kalistaja | B05B 17/04 174/250 |
| 2016/0185101 A1 | 6/2016 | Lee et al. | |
| 2016/0297222 A1 | 10/2016 | Allington et al. | |
| 2017/0342282 A1 | 11/2017 | Torfs et al. | |
| 2017/0355858 A1* | 12/2017 | Loccufier | B32B 17/10036 |
| 2018/0257978 A1 | 9/2018 | Minamidate et al. | |
| 2018/0311892 A1 | 11/2018 | Abbott, Jr. et al. | |
| 2019/0381786 A1 | 12/2019 | Watanabe | |
| 2020/0122436 A1 | 4/2020 | Mannheim Astete et al. | |
| 2020/0171800 A1 | 6/2020 | Cleary et al. | |
| 2020/0215796 A1 | 7/2020 | Butler et al. | |
| 2020/0239358 A1 | 7/2020 | Urata et al. | |
| 2020/0290318 A1 | 9/2020 | Mannheim Astete et al. | |
| 2020/0310014 A1 | 10/2020 | Bard et al. | |
| 2020/0391577 A1 | 12/2020 | Bard et al. | |
| 2020/0392358 A1 | 12/2020 | Courtet et al. | |
| 2021/0078299 A1 | 3/2021 | Keller | |
| 2021/0178799 A1 | 6/2021 | Cofler et al. | |
| 2021/0237540 A1 | 8/2021 | Kojima et al. | |
| 2021/0394488 A1 | 12/2021 | Sadakane et al. | |
| 2023/0191753 A1 | 6/2023 | Jamart | |
| 2023/0211587 A1* | 7/2023 | Tu | B32B 17/10064 428/38 |
| 2023/0226987 A1 | 7/2023 | He et al. | |

FOREIGN PATENT DOCUMENTS

| | | |
|---|---|---|
| CN | 114531874 A | 5/2022 |
| CN | 114765970 A | 7/2022 |
| CN | 114981225 A | 8/2022 |
| CN | 113682113 B | 11/2022 |
| CN | 111470781 B | 1/2023 |
| CN | 116766891 A | 9/2023 |
| EP | 2060546 A1 | 5/2009 |
| EP | 2168774 B1 | 2/2011 |
| EP | 2436527 A2 | 4/2012 |
| EP | 3034312 A1 | 6/2016 |
| EP | 2054352 B1 | 1/2019 |
| EP | 1 644 295 B1 | 8/2020 |
| EP | 3549389 B1 | 2/2021 |
| EP | 3799587 A1 | 4/2021 |
| EP | 3 515 654 B1 | 6/2021 |
| FR | 2750419 A1 | 1/1998 |
| JP | 2003-017171 A | 1/2003 |
| JP | 2015076407 A | 4/2015 |
| JP | 2018538222 A | 12/2018 |
| JP | 7295115 B2 | 6/2023 |
| KR | 20130059644 A | 6/2013 |
| WO | 9118757 A1 | 12/1991 |
| WO | 2012022904 A1 | 2/2012 |
| WO | WO 2012/027904 A1 | 2/2012 |
| WO | WO 2012//028820 A1 | 3/2012 |
| WO | 2021084279 A1 | 5/2021 |
| WO | 2021090243 A1 | 5/2021 |
| WO | 2021094625 A1 | 5/2021 |
| WO | 2021110723 A1 | 6/2021 |
| WO | WO 2021/105422 A1 | 6/2021 |
| WO | WO 2021/204551 A1 | 10/2021 |
| WO | WO 2021/209433 A1 | 10/2021 |
| WO | 2021220206 A1 | 11/2021 |
| WO | 2021233807 A1 | 11/2021 |
| WO | WO 2021/233703 A1 | 11/2021 |
| WO | WO 2022/057951 A1 | 3/2022 |
| WO | 2023285743 A1 | 1/2023 |
| WO | 2023020933 A1 | 2/2023 |
| WO | 2023058617 A1 | 4/2023 |

(56) References Cited

FOREIGN PATENT DOCUMENTS

| | | |
|---|---|---|
| WO | 2023058618 A1 | 4/2023 |
| WO | 2023146762 A1 | 8/2023 |

OTHER PUBLICATIONS

EP 1 644 295 B1, Aug. 5, 2020, Machine-Assisted English Translation.
EP 3 515 654 B1, Jun. 9, 2021, U.S. Pat. No. 11,362,473 B2.
JP 2003-017171 A, Jan. 17, 2003, Machine-Assisted English Translation of Equivalent WO 2005/003048 A1.
WO 2012/027904 A1, Feb. 23, 2012, Machine-Assisted English Translation.
WO 2012/028820 A1, Mar. 8, 2012, Machine-Assisted English Translation.
WO 2021/105422 A1, Jun. 3, 2021, Machine-Assisted English Translation.
WO 2021/204551 A1, Oct. 14, 2021, Machine-Assisted English Translation.
WO 2021/209433 A1, Oct. 21, 2021, Machine-Assisted English Translation.
WO 2021/233703 A1, Nov. 25, 2021, Machine-Assisted English Translation.
WO 2022/057951 A1, Mar. 24, 2022, Machine-Assisted English Translation.
English language abstract and machine-assisted English translation for CN 1106335291 A extracted from espacenet.com database on Jul. 13, 2022, 9 pages.
English language abstract for EP 1 644 295 B1 and machine-assisted English translation for equivalent WO 2005/003048 A1 extracted from espacenet.com database on Jul. 13, 2022, 12 pages.
English language abstract for EP 3 515 654 B1 extracted from espacenet.com database on Jul. 13, 2022, 2 pages.
English language abstract and machine-assisted English translation for JP 2003-017171 A extracted from espacenet.com database on Jul. 13, 2022, 12 pages.
English language abstract and machine-assisted English translation for WO 2012/022904 A1 extracted from espacenet.com database on Jul. 13, 2022, 10 pages.
English language abstract and machine-assisted English translation for WO 2012/028820 A1 extracted from espacenet.com database on Jul. 13, 2022, 22 pages.
English language abstract and machine-assisted English translation for WO 2021/105422 A1 extracted from espacenet.com database on Jul. 13, 2022, 13 pages.
English language abstract and machine-assisted English translation for WO 2021/204551 A1 extracted from espacenet.com database on Jul. 13, 2022, 23 pages.
English language abstract and machine-assisted English translation for WO 2021/209433 A1 extracted from espacenet.com database on Jul. 13, 2022, 19 pages.
English language abstract and machine-assisted English translation for WO 2021/233703 A1 xtracted from espacenet.com database on Jul. 13, 2022, 9 pages.
English language abstract and machine-assisted English translation for WO 2022/057951 A1 extracted from espacenet.com database on Jul. 13, 2022, 16 pages.
The Usglass News Network (USGNN), "NSG Group and University of Cambridge Sowing Seeds for Future Glass Applications", https://www.usglassmag.com/2020/10/nsg-group-and-university-of-cambridge-sowing-seeds-for-future-glass-applications/, Oct. 23, 2020, 2 pages.
U.S. Appl. No. 17/860,296, filed Jul. 8, 2022.
U.S. Appl. No. 17/860,411, filed Jul. 8, 2022.
U.S. Appl. No. 17/860,576, filed Jul. 8, 2022.
English language abstract and machine-assisted English translation for CN 114531874 A extracted from espacenet.com database on Oct. 27, 2023, 26 pages.
English language abstract and machine-assisted English translation for CN 114765970 A extracted from espacenet.com database on Oct. 27, 2023, 16 pages.
English language abstract and machine-assisted English translation for CN 114981225 A extracted from espacenet.com database on Oct. 27, 2023, 22 pages.
English language abstract and machine-assisted English translation for CN 113682113 B extracted from espacenet.com database on Oct. 27, 2023, 13 pages.
English language abstract and machine-assisted English translation for CN 111470781 B extracted from espacenet.com database on Oct. 27, 2023, 14 pages.
English language abstract and machine-assisted English translation for CN 116766891 A extracted from espacenet.com database on Oct. 27, 2023, 17 pages.
English language abstract and machine-assisted English translation for FR 2 750 419 A1 extracted from espacenet.com database on Nov. 7, 2023, 6 pages.
English language abstract for JP 7295115 B2 extracted from espacenet.com database on Oct. 27, 2023, 2 pages.
English language abstract and machine-assisted English translation for KR 20130059644 A extracted from espacenet.com database on Nov. 7, 2023, 10 pages.
English language abstract and machine-assisted English translation for WO 2023/285743 A1 extracted from espacenet.com database on Oct. 27, 2023, 11 pages.
English language abstract and machine-assisted English translation for WO 2023/020933 A1 extracted from espacenet.com database on Oct. 27, 2023, 12 pages.
English language abstract and machine-assisted English translation for WO 2023/058617 A1 extracted from espacenet.com database on Oct. 27, 2023, 26 pages.
English language abstract and machine-assisted English translation for WO 2023/058618 A1 extracted from espacenet.com database on Oct. 27, 2023, 29 pages.
FR 2 750 419 A1, Jan. 2, 1998, Machine-Assisted English Translation.
KR 20130059644 A, Jun. 7, 2013, Machine-Assisted English Translation.
CN 114531874 A, May 24, 2022, Machine-Assisted English Translation.
CN 114765970 A, Jul. 19, 2022, Machine-Assisted English Translation.
CN 114981225 A, Aug. 30, 2022, Machine-Assisted English Translation.
CN 113682113 B, Nov. 18, 2022, Machine-Assisted English Translation.
CN 111470781 B, Jan. 13, 2023, Machine-Assisted English Translation.
CN 116766891 A, Sep. 19, 2023, Machine-Assisted English Translation.
JP 7295115 B2, Jun. 20, 2023, U.S. 2021/0237540 A1.
WO 2023285743 A1, Jan. 19, 2023, Machine-Assisted English Translation.
WO 2023/020933 A1, Feb. 23, 2023, Machine-Assisted English Translation.
WO 2023/058617 A1, Apr. 13, 2023, Machine-Assisted English Translation.
WO 2023/058618 A1, Apr. 13, 2023, Machine-Assisted English Translation.
Kao Collins, "UV LED Printing for Automotive Application", https://www.kaocollins.com/inktank/uv-led-printing-automotove-applications/, 2022, 7 pages.
Tint Depot, "Do It Yourself Window Tinting", https://tintdepot.com/do-it-yourself-window-tinting/, 2024, 11 pages.
Wikihow, "How To Tint Car Windows", https://www.wikihow.com/Tint-Car_Windows, 2022, 8 pages.
Youtube, "How to Apply a Decal to Your Car Window", https://www.youtube.com/watch?v=VjQQ0bUDvH4, 2013, 2 pages.
English language abstract for JP 2015-076407 A extracted from espacenet.com database on Jun. 19, 2024, 2 pages.

(56) References Cited

OTHER PUBLICATIONS

Emglish language abstract for JP 2018-538222 A extracted from espacenet.com database on Jun. 19, 2024, 2 pages.

* cited by examiner

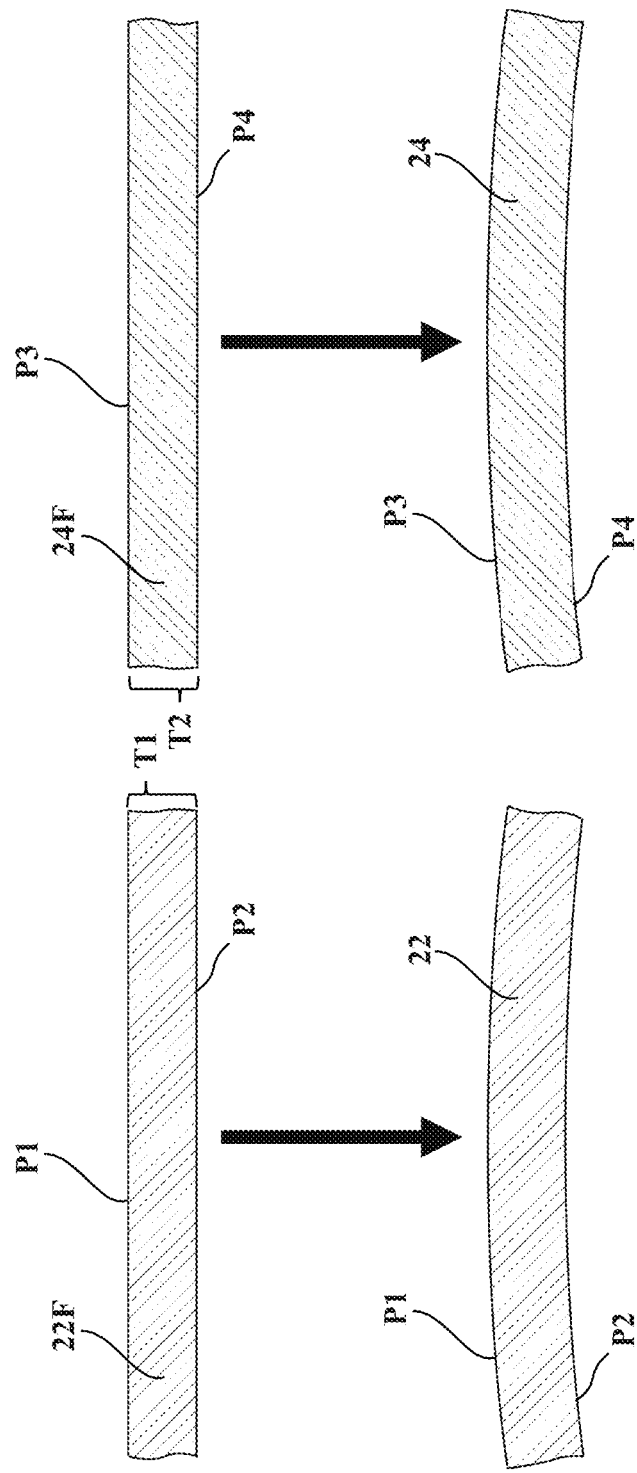

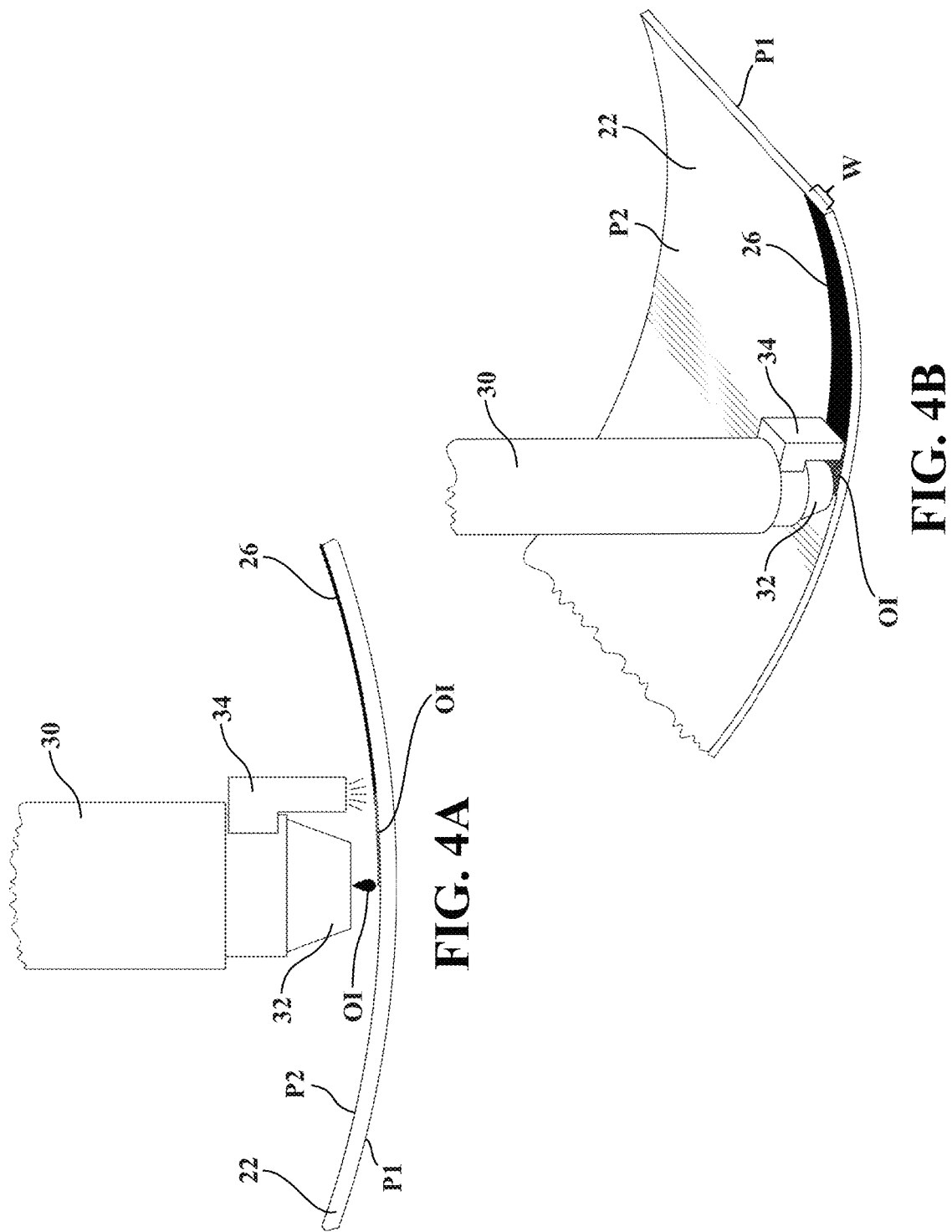

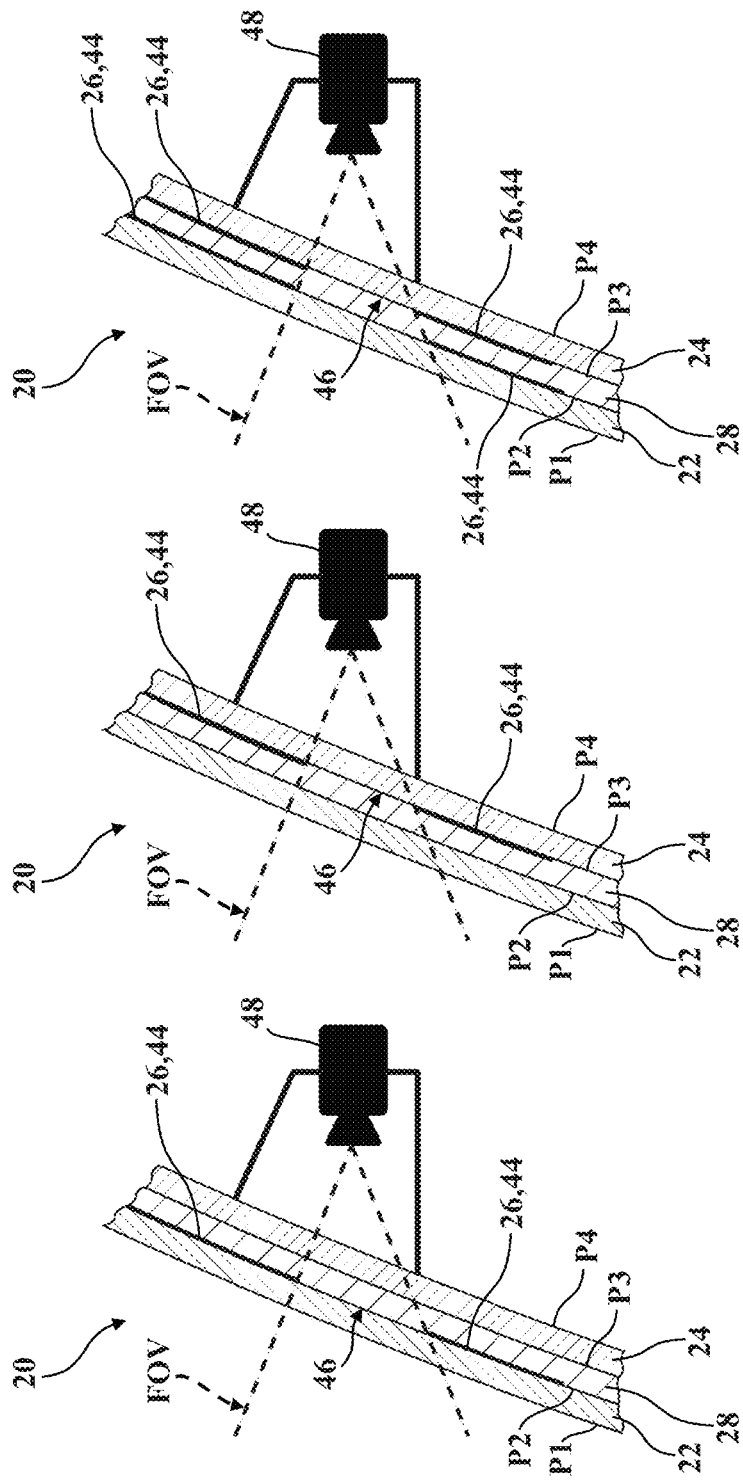

GLASS ASSEMBLY INCLUDING AN OPAQUE BOUNDARY FEATURE AND METHOD OF MANUFACTURING THEREOF

TECHNICAL FIELD

The present disclosure relates generally to glass assemblies and methods of manufacturing glass assemblies, and more specifically to glass assemblies including an opaque boundary feature and methods of manufacturing glass assemblies to include the opaque boundary feature.

BACKGROUND

Glass assemblies used in automotive contexts often include opaque boundary features. These opaque boundary features include "black bands" extending around a peripheral edge of the automotive laminate or an optical sensor boundary defining a sensing window that is aligned with a field of view of an optical sensor. These opaque boundary features are typically formed by depositing an enamel comprising a pigment and ceramic frit onto a flat glass substrate and subsequently firing the glass substrate at temperatures in excess of 500 degrees Celsius to fuse the ceramic frit of the enamel into the glass substrate. The glass substrate including the fused ceramic frit is typically fired at temperatures in excess of 600 degrees Celsius to bend the glass substrate into a desired shape. Problematically, when glass assemblies including ceramic frits are fired at these high temperatures, the portion of the glass assembly including the ceramic frit absorbs heat differently than the rest of the glass assembly which does not include the ceramic frit. For example, the portion of the glass assembly including the ceramic frit may be at a temperature of 650 degrees Celsius, while the rest of the glass assembly (not including ceramic frit) is at a temperature of 640 degrees Celsius. Accordingly, the portion of the glass assembly including the ceramic frit will have a softness that is different than the softness of the rest of the glass assembly which does not include the ceramic frit. The different softness of the portion of the glass assembly including the ceramic frit and the softness of the rest of the glass assembly causes each portion of the glass assembly to deform differently, thereby causing significant optical distortion of the glass assembly and affecting the strength of the glass assembly. This optical distortion has a particularly adverse effect on the performance of optical sensors used for semi-autonomous or autonomous driving, including cameras and LIDAR sensors.

Additionally, conventional analog printing processes (e.g. screen-printing, spray-printing with a mask, and the like) for depositing the enamel are generally limited to a maximum resolution of about 200 dots per inch and typically require a mask. As an example, in a conventional screen-printing process, a mask (i.e., a "screen") defining voids corresponding to a desired area to be printed is arranged over a substrate. The enamel is deposited over the mask in a manual process, such as with a roller, squeegee, brush, spray, or the like. These manual processes often require depositing excess enamel over the mask to ensure that all of the voids of the mask are adequately filled. Furthermore, conventional analog printing processes are typically carried out on flat substrates because it is a challenge to accurately and repeatably print onto a curved substrate.

In view of the above, there is a need for an improved method of manufacturing a glass assembly having an opaque boundary feature.

SUMMARY

The present disclosure includes a method of manufacturing a glass assembly to have an opaque boundary feature. The method includes a step of forming a first glass substrate that is curved, with the first glass substrate having an outer surface (P1) and an opposing inner surface (P2), and a second glass substrate that is curved, with the second glass substrate having an inner surface (P3) and an opposing outer surface (P4). The method also includes a step of digitally-applying an organic ink without a mask on at least one of the P2 surface and the P3 surface. The method further includes curing the organic ink to form the opaque boundary feature on at least one of the P2 surface and the P3 surface. The method also further includes disposing a polymeric interlayer between the P2 surface and the P3 surface. Advantageously, by digitally-applying the organic ink after forming the first and second curved glass substrates, the optical distortion caused by firing a glass assembly including a conventional enamel including ceramic frit is prevented. Furthermore, due to the precise control afforded by digitally-applying the organic ink, the organic ink is deposited with significantly tighter tolerances and may form significantly more detailed features than conventional analog printing processes.

BRIEF DESCRIPTION OF THE DRAWINGS

Advantages of the present disclosure will be readily appreciated as the same becomes better understood by reference to the following detailed description when considered in connection with the accompanying drawings.

FIG. 3 is a cross-sectional schematic representation of the step of forming a first glass substrate that is curved and a second glass substrate that is curved.

FIG. 4A is a front schematic representation of the steps of digitally-applying an organic ink onto the first curved glass substrate and curing the organic ink to form an opaque boundary feature.

FIG. 4B is a top perspective view of FIG. 4A.

FIGS. 8A-8C are cross-sectional schematic representations of examples of the glass assembly of FIG. 2 taken along line 8-8 including an opaque boundary feature formed as an optical sensor boundary.

DETAILED DESCRIPTION

Figure 1:
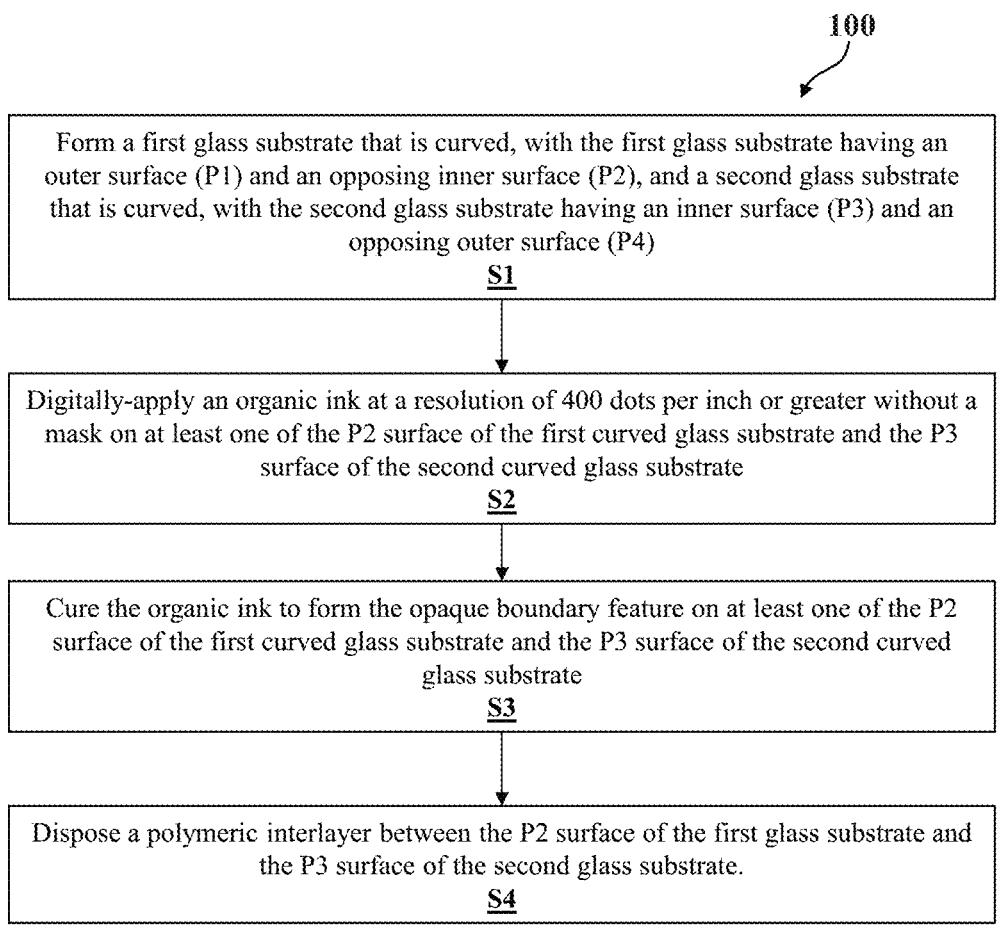
FIG. 1 is a flowchart illustrating the method of the present disclosure.
Figure 2:
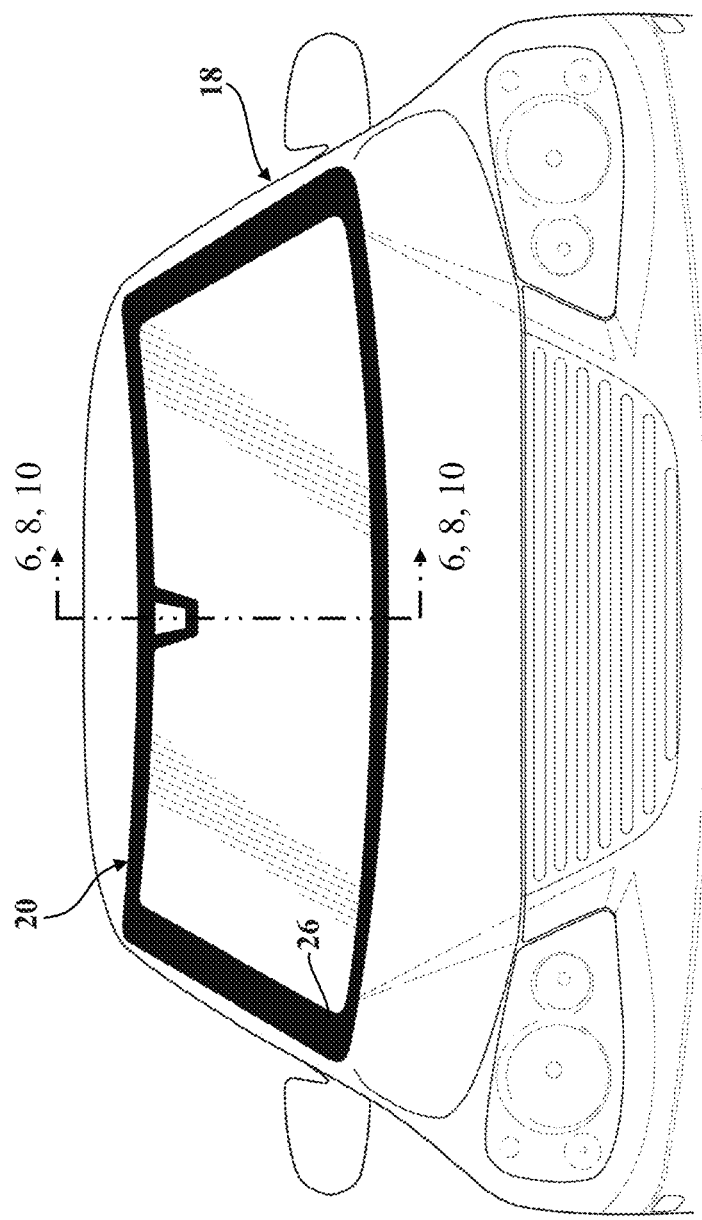
FIG. 2 is a partial front view of a vehicle including a front glass assembly including an opaque boundary feature.

Referring to the drawings, wherein like reference numerals are used to identify like or identical components in the various views, FIG. 1 schematically illustrates a method 100 of forming a glass assembly 20 to have an opaque boundary feature 26. In one example, the glass assembly 20 may be used in an automotive context as windows for a vehicle, such as a windshield, side windows, quarter windows, rear windows, and the like. For example, FIG. 2 shows a vehicle 18 including a front glass assembly 20 formed according to the method 100 to include an opaque boundary feature 26. Of course, it is to be appreciated that the method 100 of forming the glass assembly 20 can be outside the automotive context.

Referring to FIGS. 1-5C, the method 100 of forming a glass assembly 20 includes the steps of: step S1 of forming a first glass substrate 22 that is curved and a second glass substrate 24 that is curved, step S2 of digitally-applying an organic ink OI without a mask on at least one of an inner surface of the first curved glass substrate 22 and an inner surface of the second curved glass substrate 24, step S3 of curing the organic ink OI to form the opaque boundary feature 26 on at least one of the inner surface of the first curved glass substrate 22 and the inner surface of the second curved glass substrate 24, and step S4 of disposing a polymeric interlayer 28 between the inner surface of the first glass substrate 22 and the inner surface of the second glass substrate 24. Description of each of the steps S1, S2, S3 of the method 100 is included in further detail below.

As described above, step S1 of the method 100 includes forming a first glass substrate 22 that is curved and a second glass substrate 24 that is curved. Referring to FIG. 3, the first curved glass substrate 22 is formed to have an outer surface (P1) and an opposing inner surface (P2). Similarly, the second curved glass substrate 24 is formed to have an inner surface (P3) and an opposing outer surface (P4). In one example, the P4 surface may be arranged to face the interior of a vehicle when installed in the vehicle, while the P1 surface may be arranged to face outward from the vehicle when installed in the vehicle.

With continued reference to FIG. 3, in one example of step S1, both the first curved glass substrate 22 and the second curved glass substrate 24 may be initially formed as a first flat glass sheet 22F and a second flat glass sheet 24F. The first flat glass sheet 22F and the second flat glass sheet 24F may be produced using any suitable flat glass manufacturing process including, but not limited to, a float process. The first flat glass sheet 22F and the second flat glass sheet 24F may be comprised of any suitable glass composition including, but not limited to, soda-lime glass, aluminosilicate glass, borosilicate glass, boro-aluminosilicate glass, and the like. It should be appreciated that the first flat glass sheet 22F and the second flat glass sheet 24F may be comprised of the same or different glass compositions.

With continued reference to FIG. 3, after the formation of the first flat glass sheet 22F and the second flat glass sheet 24F, the first flat glass sheet 22F and the second flat glass sheet 24F are bent to form the first curved glass substrate 22 and the second curved glass substrate 24. The first flat glass sheet 22F and the second flat glass sheet 24F may be bent using any suitable glass bending process including, but not limited to, press bending, gravity bending (i.e., sag bending), roll forming, or cold bending. The first flat glass sheet 22F and the second flat glass sheet 24F may be bent into any geometry suitable for the desired application. It should be appreciated that the first flat glass sheet 22F and the second flat glass sheet 24F may be bent together (i.e., bent while disposed adjacent to each other) or separately.

Advantageously, during the bending process, the first curved glass substrate 22 and/or the second curved glass substrate 24 may be free of conventional enamel including ceramic frit, especially on portions of the glass assembly 20 where minimizing distortion is critical (e.g. the field of view of an optical sensor). Accordingly, the first curved glass substrate 22 and/or the second curved glass substrate 24 absorbs heat more uniformly than substrates including conventional enamel including ceramic frit, thereby preventing uneven deformation (i.e., optical distortion) of the first curved glass substrate 22 and/or the second curved glass substrate 24. Instead, as described below in the context of step S2 and S3, an organic ink OI is applied to and cured on a surface of the first curved glass substrate 22 and/or the second curved glass substrate 24 to form an opaque boundary feature 26 after step S1.

In other examples of step S1, the first curved glass substrate 22 and the second curved glass substrate 24 may be formed as curved substrates at the outset, as opposed to producing and subsequently bending the flat glass sheets 22F,24F. For example, the first curved glass substrate 22 and the second curved glass substrate 24 may be produced using any suitable curved glass manufacturing process including, but not limited to, glass blow molding. Similar to the flat glass sheets 22F, 24F described above, in this example, the first curved glass substrate 22 and the second curved glass substrate 24 may be comprised of any suitable glass composition including, but not limited to, soda-lime glass, aluminosilicate glass, borosilicate glass, boro-aluminosilicate glass, and the like. Also similarly, it should be appreciated that the first curved glass substrate 22 and the second curved glass substrate 24 may be comprised of the same or different glass compositions.

In some examples, the first curved glass substrate 22 and the second curved glass substrate 24 are transparent. In this context, the term "transparent", also referred to as "substantially transparent", refers to a material that allows 70% or more of light transmission in a predefined visible light range to travel therethrough. Unless otherwise indicated, the predefined visible light range is the segment of the electromagnetic spectrum that the human eye can view. More simply, this range of wavelengths is called visible light. Typically, the human eye can detect wavelengths from about 380 to about 780 nanometers, and thus the predefined visible light range as defined herein refers to wavelengths of light from about 380 to about 780 nanometers unless otherwise indicated. In some examples, the first curved glass substrate 22 and the second curved glass substrate 24 may include various additives to alter the transmissivity of the first curved glass substrate 22 and the second curved glass substrate 24; for example, additives may provide various levels of tint or coloration while still maintaining the first curved glass substrate 22 and the second curved glass substrate 24 as "transparent" or "substantially transparent" as described above.

In other examples, one or both of the first curved glass substrate 22 and the second curved glass substrate 24 are less transparent than described above. For example, where the glass assembly 20 is a privacy glass, the transparency of the glass assembly 20 is substantially reduced, and thus the glass assembly 20 allows less than 70% light transmission in a predefined wavelength range, such as from greater than 0 to 70% light transmission at the predefined wavelength range.

The first curved glass substrate 22 has a thickness T1, and the second curved glass substrate 24 has a thickness T2. The thicknesses T1, T2 of the first curved glass substrate 22 and the second curved glass substrate 24, respectively, may be any suitable thickness for the application. For example, in automotive laminate applications, the thicknesses T1, T2 of the first curved glass substrate 22 and the second curved glass substrate 24, respectively, may be from about 0.3 mm to about 4.1 mm. More specifically, the thicknesses T1, T2, may each be about 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, or 4.1 mm. It should be appreciated that the thickness T1 and the thickness T2 can be the same or different. In one example, the first curved glass substrate 22 and the second curved glass substrate 24 have the same thickness (i.e., where T1 is equal to T2) such that the glass assembly 20 is considered a "symmetric" laminate. However, in another example, the first curved glass substrate 22 and the second curved glass substrate 24 have different thicknesses (i.e., where T1 is not equal to T2) such that the glass assembly 20 is considered an "asymmetric" laminate. All combinations of the example T1 and T2 values listed above and all fractional values therebetween are contemplated.

Step S2 of the method 100 includes digitally-applying an organic ink OI without a mask on at least one of the P2 surface of the first curved glass substrate 22 and the P3 surface of the second curved glass substrate 24. For example, FIGS. 4A-4B illustrate digitally-applying the organic ink OI onto the P2 surface of the first curved glass substrate 22. However, it should be appreciated that "at least one of the P2 surface of the first curved glass substrate 22 and the P3 surface of the second curved glass substrate 24" includes digitally-applying the organic ink OI on only the P2 surface, on only the P3 surface, or on both the P2 surface and the P3 surface.

Notably, the organic ink OI is typically a liquid when digitally applied in step S2. However, it should be appreciated that the organic ink OI may also be applied in other forms including, but not limited to, a powder. Additionally, the organic ink OI may be free of ceramic frit, and, thus, in some examples, the glass assembly 20 formed according to the method 100 may be free of ceramic frit. As described in further detail below, the method 100 includes step S3 of curing the organic ink OI to solidify the organic ink OI to form the opaque boundary feature 26.

Notably, because the organic ink OI is solidified onto the substrate on which it is applied, as opposed to being fired, the organic ink OI does not fuse to the substrate like an enamel including ceramic frit. Advantageously, because the glass assembly 20 formed according to the method 100 is not fired to fuse the organic ink OI to the first curved glass substrate 22 and/or the second curved glass substrate 24, the strength of the first curved glass substrate 22 and/or the second curved glass substrate 24 is not affected. However, because the organic ink OI does not fuse to the first curved glass substrate 22 and/or the second curved glass substrate 24, the opaque boundary feature 26 may be more fragile as compared to conventional opaque boundary features formed from an enamel including ceramic frit. Accordingly, it is advantageous to digitally apply the organic ink OI on at least one of the P2 surface of the first curved glass substrate 22 and the P3 surface of the second curved glass substrate 24 such that, upon lamination of the glass assembly (described below in the context of step S4), the opaque boundary feature 26 is sandwiched within the glass assembly 20 such that the first curved glass substrate 22 and/or the second curved glass substrate 24 protect the opaque boundary feature 26 from the surrounding environment.

Another advantage of the organic ink OI is that it allows the glass assembly 20 to be recyclable. If a glass assembly including a conventional enamel were to be melted down, the enamel would contaminate the melted glass such that the melted glass would not be suitable for re-use as a glass assembly for a vehicle. However, when the glass assembly 20 is formed according to the method 100, the organic ink OI burns off when the glass assembly 20 is melted, thus not contaminating the melted glass.

The term digitally-applying refers to any suitable application process where application of the organic ink OI is digitally controlled to deposit the organic ink OI on a substrate in accordance with a digital based image, as opposed to conventional analog printing processes. Example processes for digitally-applying the organic ink OI include, but are not limited to, inkjet printing, electrohydrodynamic printing, laser printing, and the like. Notably, due to the precise control afforded by digitally-applying the organic ink OI according to step S2 of the method 100, the organic ink OI may be deposited at a significantly higher resolution than conventional analog printing processes. For example, the organic ink OI may be digitally applied on at least one of the P2 surface and the P3 surface at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

Accordingly, the higher resolution of the digital application process of step S2 allows the organic ink OI to be deposited to form significantly more detailed features and achieve significantly tighter tolerances than conventional analog printing processes. In other words, "more detailed" features may include forming components of the opaque boundary feature 26 that have a smaller geometry than achievable with conventional analog printing processes. Additionally, using a conventional analog printing process, such as screen printing, the opaque boundary feature 26 may only be able to be repeatably located within a +/−1.5 millimeter tolerance. By contrast, due to the precise control afforded by digitally-applying the organic ink OI according to step S2 of the method 100, the opaque boundary feature 26 may be more repeatably located in production than conventional analog screen printing processes. For example, using the digital application process of step S2 the opaque boundary feature 26 may be repeatably located within a +/−0.1 millimeter tolerance.

Additionally, it is notable that a mask is not required when digitally-applying the organic ink OI, as is typically required in conventional analog printing processes. For example, as shown in FIGS. 4A and 4B, when digitally-applying the organic ink OI according to step S2 of the method 100, the organic ink OI is deposited directly onto at least one of the P2 surface and the P3 surface in accordance with a digital based image, eliminating the need for a mask and using less ink than the excess ink required for conventional analog printing employing a mask. Further, due to increased control afforded by digitally-applying the organic ink OI, it is possible to digitally apply the organic ink OI as a much thinner layer than possible with conventional analog printing processes. As an example, the organic ink OI may have a thickness of greater than 0.1 micrometers and less than 15 micrometers on at least one of the P2 surface and the P3 surface. Additionally, it is contemplated that the organic ink OI may be digitally applied at a variable thickness and cured to form an opaque boundary feature 26 having a variable thickness.

Further, digitally-applying the organic ink OI according to the method 100 is advantageous over conventional analog printing processes because the digital-based image used to control the digital-application process can be changed quickly and electronically, whereas changing the design for a conventional analog printing process requires producing new physical printing tooling (such as screens for screen printing). Accordingly, digitally-applying the organic ink OI according to step S2 of the method 100 allows for rapid prototyping of many different arrangements of opaque boundary features 26 by only changing the digital-based image, as opposed to producing new analog printing tooling.

In one example, step S2 of digitally-applying the organic ink OI comprises inkjet-printing the organic ink OI on at least one of the P2 surface and the P3 surface. Generally, the term "inkjet-printing" refers to a printing process where a digitally controlled printhead propels droplets of ink onto a substrate in accordance with a digital based image. Examples of inkjet printing processes include, but are not limited to, continuous inkjet printing, thermal inkjet printing, piezo inkjet printing, drop-on-demand inkjet printing, and the like. Inkjet-printing the organic ink OI on at least one of the P2 surface and the P3 surface may be carried out at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

In another example, step S2 of digitally-applying the organic ink OI comprises electro-hydrodynamically printing the organic ink OI onto the surface of the first curved glass substrate 22 and/or the second curved glass substrate 24. Generally, the term "electro-hydrodynamic printing" refers to a printing process where a digitally controlled and electrically charged printhead directs ink through a nozzle and onto a substrate in accordance with a digital based image. In some examples, the width of the nozzle may be as low as 10 micrometers such that the width W of the opaque boundary feature 26 formed per pass is likewise 10 micrometers. Of course, it should be appreciated that a width of the nozzle may be selected that is wider than 10 micrometers. Additionally, it is contemplated that electro-hydrodynamically printing the organic ink OI onto a surface of the first curved glass substrate 22 and/or the second curved glass substrate 24 may be carried out at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

As noted above, there is a challenge with digitally-applying inks onto a curved substrate. Accordingly, in one example, step S2 of digitally-applying the organic ink OI comprises providing a robotic applicator 30 including a printhead 32. In this example, step S2 of digitally-applying the organic ink OI further comprises positioning the robotic applicator 30 adjacent to at least one of the P2 surface of the first curved glass substrate 22 and the P3 surface of the second curved glass substrate 24. For illustrative purposes, FIGS. 4A and 4B show a schematic representation of a robotic applicator 30 and printhead 32 positioned adjacent to the P2 surface of the first curved glass substrate 22. With continued reference to FIGS. 4A and 4B, in the context of the present example, step S2 of digitally-applying the organic ink OI comprises digitally-applying the organic ink OI from the printhead 32 of the robotic applicator 30 without a mask on the P2 surface as the robotic applicator 30 moves the printhead 32 along the P2 surface.

Any suitable robotic applicator 30 that is capable of moving the printhead 32 along a surface of a curved substrate is contemplated. In other words, a robotic applicator 30 that is configured to follow a path that curves with the curvature of the first curved glass substrate 22 and/or the second curved glass substrate 24 as the robotic applicator 30 moves the printhead 32 along the surface of the first curved glass substrate 22 and/or the second curved glass substrate 24 is desired. More specifically, a robotic applicator 30 is desired that is suitable for maintaining a certain distance between the printhead 32 and the surface of the curved substrate and maintaining the printhead 32 at an angle that is substantially perpendicular to the surface of the curved substrate. For example, the robotic applicator 30 may be a six-axis robot, a Cartesian robot, or the like that is configured to move the printhead 32 along the surface of the curved substrate.

It is contemplated that the organic ink OI is digitally applied at a width W per each pass of the robot applicator 30. The maximum width W per pass that the printhead 32 may apply the organic ink OI is based on the design and/or settings of the printhead 32. Any suitable printhead 32 capable of digitally-applying the organic ink OI without a mask is contemplated. In one example, the printhead 32 digitally applies the organic ink OI at a width W of from 30 millimeters to 70 millimeters per pass of the robotic applicator 30 Other printheads 32 are contemplated. It is also contemplated that the robotic applicator 30 may include multiple printheads 32 arranged adjacent to each other to increase the width that the robotic applicator 30 may digitally apply the organic ink OI per pass.

Step S3 of the method 100 includes curing the organic ink OI to form the opaque boundary feature 26 on at least one of the P2 surface of the first curved glass substrate 22 and the P3 surface of the second curved glass substrate 24. Notably, after digital application, the organic ink OI may spread out or disperse on the surface of the curved glass substrate 22 before step S3 of curing the organic ink M. For example, the organic ink OI may be digitally-applied at a resolution of 400 dots per inch in step S2; however, before the curing step S3, the organic ink OI that was digitally-applied at 400 dots per inch may spread out on the surface of the curved glass substrate 22 such that, upon completion of the curing step S3, the opaque boundary feature 26 has a lower resolution of, for example, 200 dots per inch, than the resolution upon the initial digital application. Additionally, the curing step S3 itself may affect the resolution of the opaque boundary feature 26. For example, the organic ink OI may expand or contract during the curing step S3, affecting the resolution of the opaque boundary feature 26.

Accordingly, the resolution of the organic ink OI when digitally applied in step S2 may differ from the resolution of the opaque boundary feature 26 after completion of step S3 of curing the digitally applied organic ink M. Thus, upon completion of step S3 of curing the digitally applied organic ink OI, the opaque boundary feature 26 may have a resolution of greater than 200 dots per inch. Particularly, it is contemplated that the opaque boundary feature 26 may have a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

As mentioned above, it is advantageous to cure the organic ink OI because the organic ink OI is typically a liquid when digitally applied in step S2. Accordingly, step S3 of curing the organic ink OI may be initiated shortly after step S2 of digitally-applying the organic ink to prevent running or smudging of the organic ink OI. For example, the curing step S3 may be initiated within a time period from than zero seconds to 5 seconds after step S2 of digitally-applying the organic ink OI on at least one of the P2 surface and the P3 surface. More specifically, the curing step S3 may be initiated within less than 5 seconds after step S2, less than 4 seconds after step S2, less than 3 seconds after step S2, less than 2 seconds after step S2, or less than 1 second after step S2.

In one example, step S3 of the method 100 includes thermally-curing the organic ink OI to form the opaque boundary feature 26. Any suitable thermal curing device is contemplated to thermally cure the organic ink OI including, but not limited to, an oven, a heat gun, or an IR heater. It should be appreciated that thermally-curing in the context of the present disclosure does not rise to the level of firing the glass assembly 20. As described above, typical firing processes include heating a glass substrate to temperatures in excess of 500 degrees Celsius to fuse the enamel including ceramic frit into the glass substrate and/or to bend the glass substrate into a desired shape. On the other hand, thermally-curing in the context of the present disclosure involves subjecting the first curved glass substrate 22 and/or the second curved glass substrate 24 to a temperature sufficient to cure the organic ink OI (but below the firing temperature of 500 degrees Celsius) on the surface of the first curved glass substrate 22 and/or the second curved glass substrate 24.

In some examples, the curing temperature for curing the organic ink OI is selected in view of a thermal degradation temperature of the organic ink OI. More specifically, a curing temperature is selected that is below the thermal degradation temperature of the organic ink OI to prevent the organic ink OI from burning off of the P2 surface and/or the P3 surface and to minimize optical distortion of the glass assembly 20. For example, the organic ink OI may comprise a thermally curable organic monomer and a pigment. It should be appreciated that in other examples, the organic monomer can instead be an oligomer or a combination of monomers and oligomers. In this example, the organic ink OI may have a thermal degradation temperature of 210 degrees Celsius. Accordingly, a curing temperature may be selected that is below 210 degrees Celsius, such as 200 degrees Celsius. Notably, the curing temperature for curing the organic ink OI is significantly lower than the temperatures required for firing an enamel including ceramic frit. Accordingly, the glass assembly 20 does not experiences a temperature sufficient to soften the glass assembly 20 such that the glass assembly 20 significantly deforms. Accordingly, step S3 of curing the organic ink OI is unlikely to introduce significant optical distortion into the glass assembly 20.

In other examples, step S3 of the method 100 includes photo-curing the organic ink OI with a UV curing device 34. In this example, the organic ink OI is a photo-curable organic ink OI. For example, the organic ink OI may include a photoinitiator, an organic monomer, and a pigment. It should be appreciated that in other examples, the organic monomer can instead be an oligomer or a combination of monomers and oligomers. The photoinitiator may include any suitable compound that initiates polymerization of the organic monomer in response to exposure to UV light. For example, the photoinitiator may be a compound that creates a reactive species (e.g. free radicals, cations, or anions) when exposed to UV light that initiates polymerization of the organic monomer and/or oligomer. Accordingly, in the present example, step S3 of curing the organic ink OI to form the opaque boundary feature 26 includes exposing the organic ink OI to the UV curing device 34 to activate the photoinitiator to initiate polymerization of the organic monomer to cure the organic ink OI. In this example, step S3 of curing the organic ink OI does not involve any outside application of heat, thus, this example of step S3 is less likely to introduce significant optical distortion into the glass assembly 20.

In one example, the UV curing device 34 is a UV light emitting diode that emits UV light. For example, the UV curing device 34 may emit UV light having a wavelength of 315 nanometers to 400 nanometers (generally known as the UV-A spectrum). The UV light emitting diode may emit UV light having a narrower spectrum, such as emitting UV light that substantially has a wavelength of 385 nanometers. Any wavelength within the UV spectrum is contemplated.

FIG. 4A shows one example of step S3. In the example of FIG. 4A, the robotic applicator 30 further includes the UV curing device 34. Although not required, the UV curing device 34 may be arranged adjacent to the printhead 32 such that the UV curing device 34 follows the same general path as the printhead 32 as the robotic applicator 30 moves the printhead 32 along at least one of the P2 surface and the P3 surface. Accordingly, in the present example, step S3 of curing the organic ink OI to form the opaque boundary feature 26 comprises activating the UV curing device 34 of the robotic applicator 30 to initiate photo-curing of the digitally applied organic ink OI as the robotic applicator 30 moves along at least one of the P2 surface and the P3 surface. In doing so, step S3 of curing the organic ink OI occurs shortly after step S2 of digitally-applying the organic ink to prevent running or smudging of the organic ink OI.

Figure 5A:
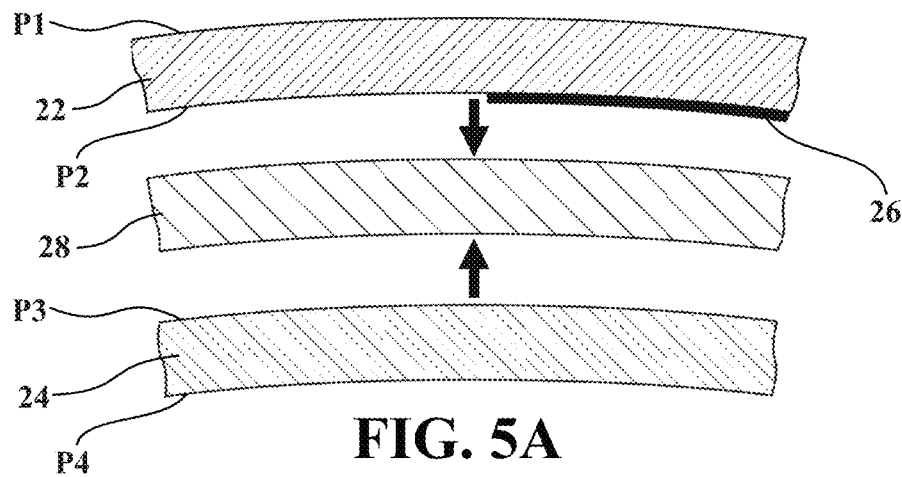
FIGS. 5A-5C are cross-sectional schematic representations of a step of disposing a polymeric interlayer between the first curved glass substrate and the second curved glass substrate.
Figure 5B:
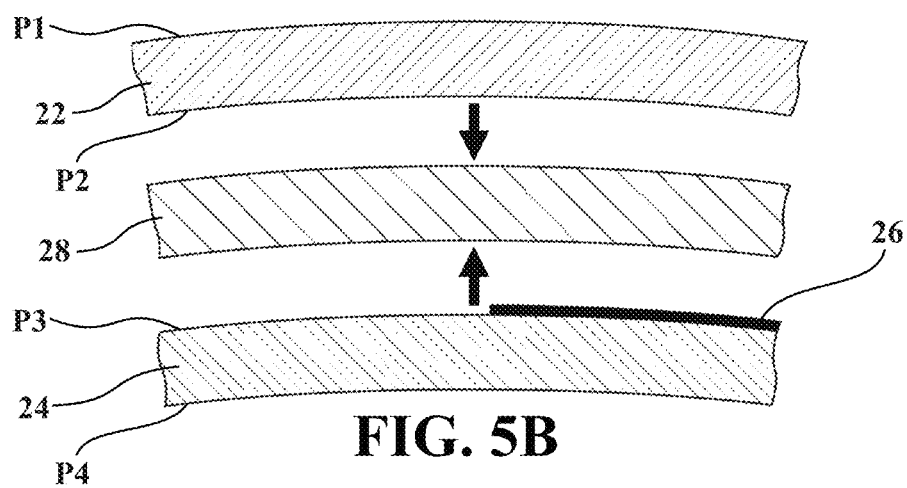
Figure 5C:
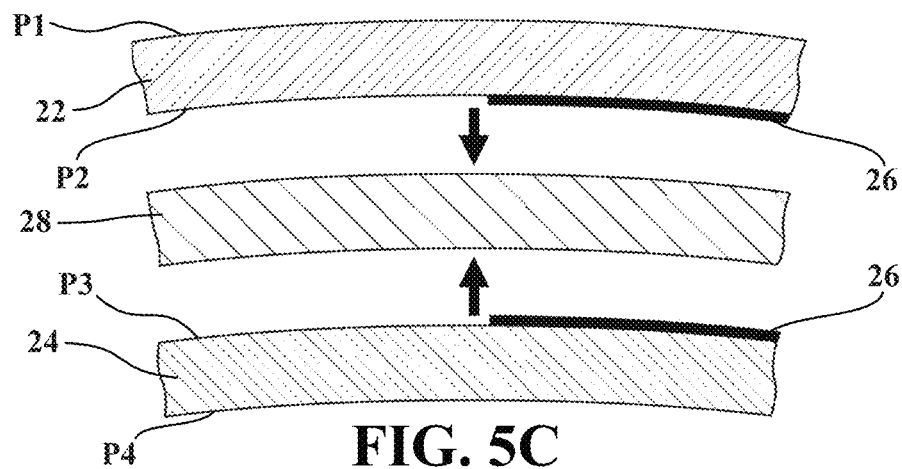

FIGS. 5A-5C show a schematic representation of step S4. Step S4 includes disposing a polymeric interlayer 28 between the P2 surface of the first curved glass substrate 22 and the P3 surface of the second curved glass substrate 24. Accordingly, the opaque boundary feature 26 that has been formed in steps S2 and S3 on at least one of the P2 surface of the first curved glass substrate 22 and the P3 surface of the second curved glass substrate 24 will be sandwiched within the glass assembly 20. FIG. 5A illustrates disposing a polymeric interlayer 28 between the P2 surface of the first curved glass substrate 22 including the opaque boundary feature 26 and the P3 surface the second curved glass substrate 24. FIG. 5B illustrates disposing a polymeric interlayer 28 between the P2 surface and the P3 surface the second curved glass substrate 24 including the opaque boundary feature 26. FIG. 5C illustrates disposing a polymeric interlayer 28 between the P2 surface of the first curved glass substrate 22 including the opaque boundary feature 26 and the P3 surface the second curved glass substrate 24 also including the opaque boundary feature 26.

In one example, step S4 constitutes a lamination process whereby a laminated glass assembly 20 is formed. The polymeric interlayer 28 bonds the first curved glass substrate 22 and the second curved glass substrate 24 such that the polymeric interlayer 28 retains the first curved glass substrate 22 and/or the second curved glass substrate 24 in the event of impact or breakage of the glass assembly 20. The polymeric interlayer 28 includes a polymer or thermoplastic resin, such as polyvinyl butyral (PVB), ethylene-vinyl acetate (EVA), thermoplastic polyurethane (TPU), and the like. Other suitable materials for implementing the polymeric interlayer 28 may be utilized that provide the requisite performance characteristics regarding optical haze, adhesion to glass, and structural rigidity. Similar to the first curved glass substrate 22 and the second curved glass substrate 24, the polymeric interlayer 28 is also substantially transparent or otherwise transparent to light. Accordingly, the laminated glass assembly 20 that includes the polymeric interlayer 28 between the first curved glass substrate 22 and the second curved glass substrate 24 is also substantially transparent or otherwise transparent to light.

An example lamination process comprises the steps of stacking and aligning the first curved glass substrate 22, the second curved glass substrate 24, the polymeric interlayer 28, and any other interlayers that may be a part of the glass assembly 20. After stacking and aligning these components, the glass assembly 20 may be subject to a de-airing process where the glass assembly 20 is subject to a vacuum to remove any air that may be trapped between the first curved glass substrate 22, the second curved glass substrate 24, the polymeric interlayer 28, and any other interlayers. After the de-airing process, the glass assembly 20 may be subject to an autoclave process where the glass assembly 20 is subject to an elevated temperature and/or an elevated pressure to bond the polymeric interlayer 28 to each of the layers adjacent to the polymeric interlayer 28 to form the laminated glass assembly 20. Notably, the temperature within the autoclave should be below the thermal degradation temperature of the organic ink OI to prevent damage to the organic ink OI.

In some examples, step S3 of the method 100 may further include subjecting the glass assembly 20 to elevated humidity and/or pressure during one of the curing processes contemplated above.

Figure 6A:
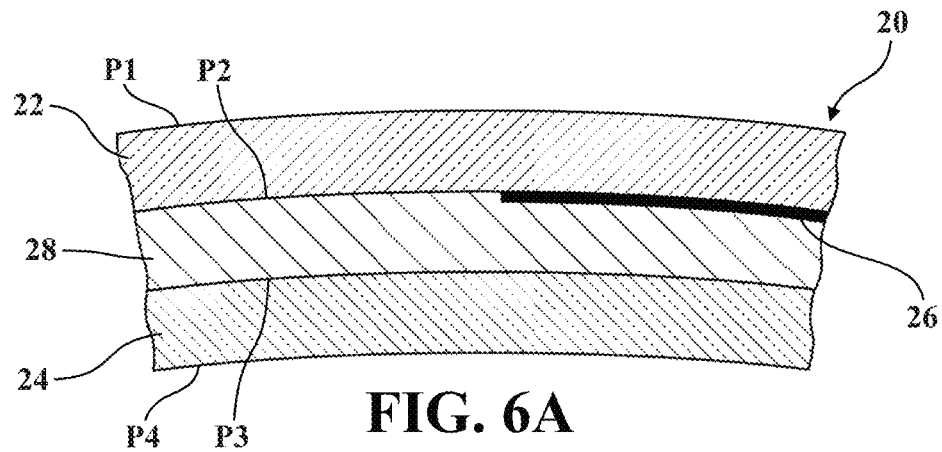
FIGS. 6A-6C are cross-sectional schematic representations of examples of the glass assembly of FIG. 2 taken along line 6-6 including an opaque boundary feature.
Figure 6B:
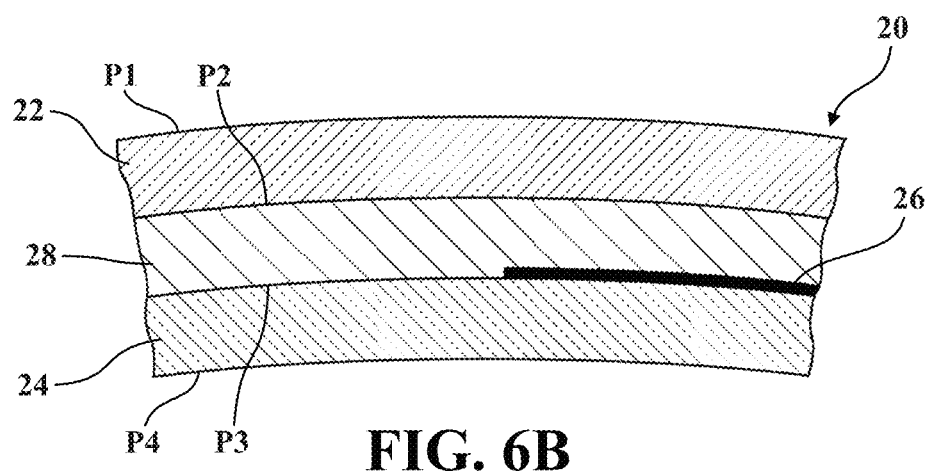
Figure 6C:
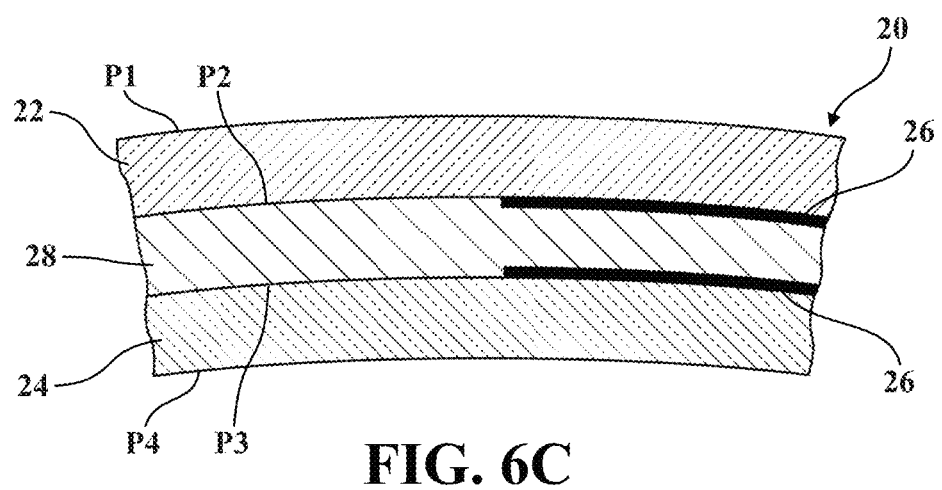

Referring now to FIGS. 6A-9B, various examples of the glass assembly 20 including the opaque boundary feature 26 are illustrated. First, FIGS. 6A-6C show cross-sectional schematic representations of the glass assembly 20 including the opaque boundary feature 26. In the example shown in FIG. 6A, the glass assembly 20 includes the first curved glass substrate 22, the opaque boundary feature 26 formed on the P2 surface of the first curved glass substrate 22, the second curved glass substrate 24, and the polymeric interlayer 28 disposed between the P2 surface and the P3 surface. In the example shown in FIG. 6B, the glass assembly 20 includes the first curved glass substrate 22, the second curved glass substrate 24, the opaque boundary feature 26 formed on the P3 surface of the second curved glass substrate 24, and the polymeric interlayer 28 disposed between the P2 surface and the P3 surface. In the example shown in FIG. 6C, the glass assembly 20 includes the first curved glass substrate 22, one opaque boundary feature 26 formed on the P2 surface of the first curved glass substrate 22, the second curved glass substrate 24, another opaque boundary feature 26 formed on the P3 surface of the second curved glass substrate 24, and the polymeric interlayer 28 disposed between the P2 surface and the P3 surface.

Figure 7A:
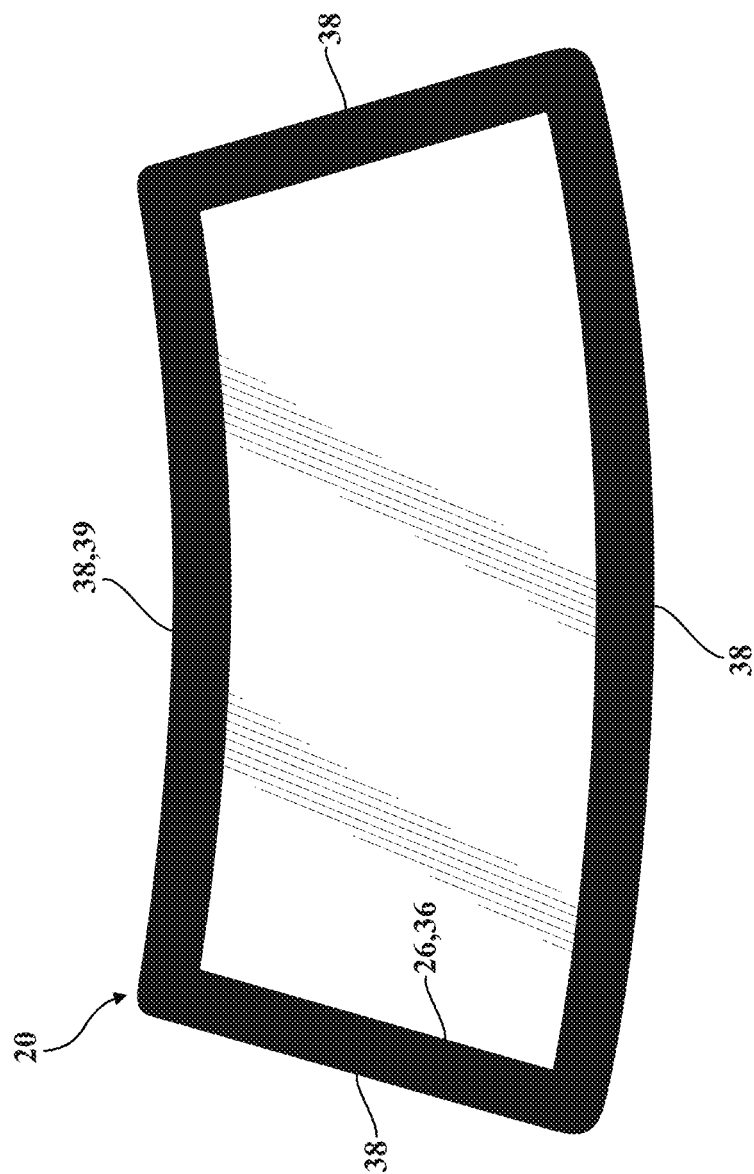
FIG. 7A is a front view of a glass assembly including an opaque boundary feature formed as a band.
Figure 7B:
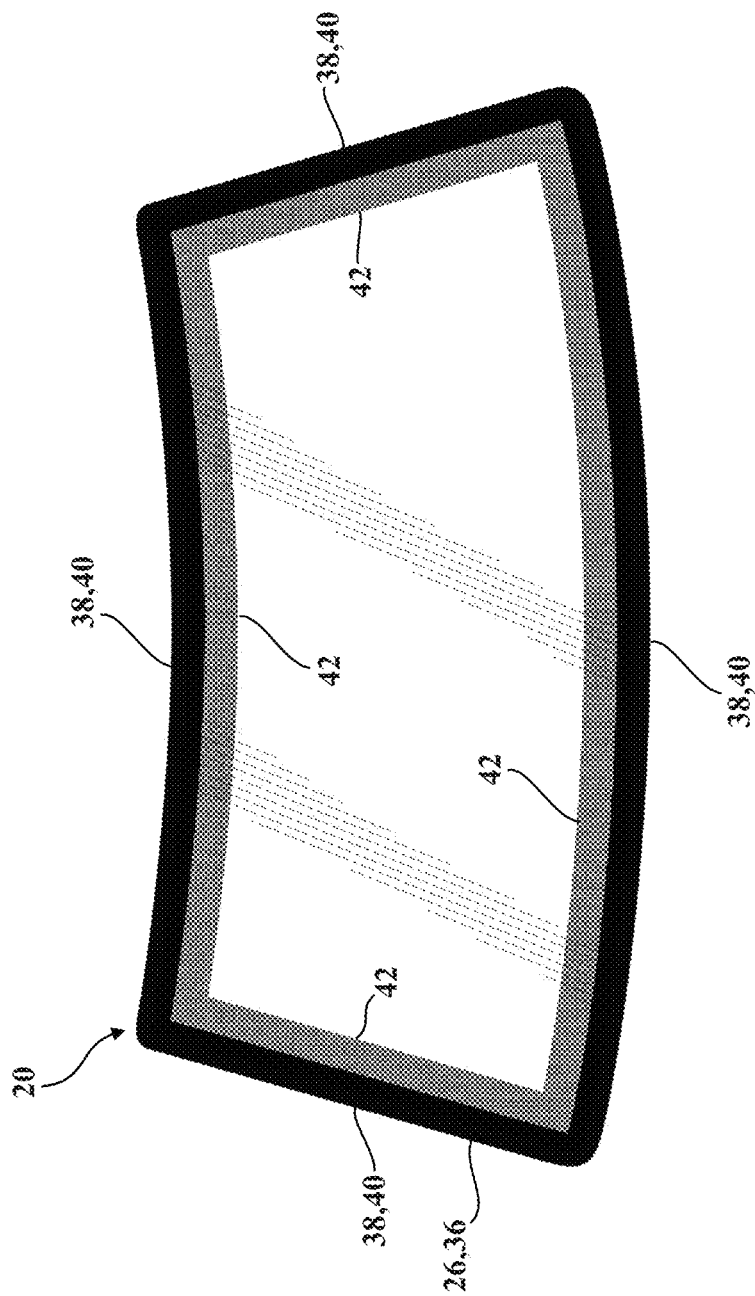
FIG. 7B is a front view of a glass assembly including an opaque boundary feature formed as a band, with the band having a first opacity at a first edge and a second opacity at a second edge.

FIGS. 7A and 7B each show a front view of a glass assembly 20 formed according to the method 100. In these examples, the opaque boundary feature 26 is formed as a band 36 extending around the entirety of a peripheral edge 38 of the glass assembly 20. In FIGS. 7A and 7B, the glass assembly 20 is a windshield. However, it is contemplated that the opaque boundary features 26 formed as a band 36 extending around the entirety of a peripheral edge 38 of the glass assembly 20 may be formed in other examples of the glass assembly 20 such as side windows, quarter windows, rear windows, and the like. The band 36 extending around the entirety of the peripheral edge 38 of the glass assembly 20 serves a number of functions. The band 36 blocks transmission of light through the region of the glass assembly 20 extending around the entirety of a peripheral edge 38. In doing so, the band 36 prevents UV light from deteriorating an underlying adhesive that may bond the glass assembly 20 to the vehicle. As another example, the band 36 may extend further down from the top 39 of the glass assembly 20 to function as a sunshade to shield a driver's eyes from sunlight. The band 36 may also block visibility of the underlying adhesive to an outside observer, providing an improved aesthetic exterior appearance. As another example, the band 36 may define a decorative pattern that is aesthetically pleasing, such as a dot pattern, a manufacturer logo, or governmentally required information (such as information required by FMVSS 205).

Referring to FIG. 7A, in one example, the opaque boundary feature 26 has an opacity that is uniform throughout the entire opaque boundary feature 26. In this context, opacity refers to an average transmission of visible light through a sample area of the opaque boundary feature 26. The opacity of the opaque boundary feature 26 may be measured using a light transmittance meter (for example, according to ISO 9050 and/or ISO 13837) to determine the amount of light that the opaque boundary feature 26 absorbs, scatters, or reflects. In one example, the opaque boundary feature 26 may have an opacity of less than 1% transmission of visible light, or even less than 0.1% transmission of visible light.

In other examples, referring to FIG. 7B, the opaque boundary feature 26 has a first edge 40 and a second edge 42 opposite the first edge 40. The first edge 40 may be the peripheral edge 38 of the glass assembly 20, and the opaque boundary feature 26 may terminate at the second edge 42 as the opaque boundary feature 26 extends inward from the first edge 40. In the example of FIG. 7B, the opaque boundary feature does not have an opacity that is uniform throughout the entire opaque boundary feature 26. Rather, the opaque boundary feature 26 has a first opacity at the first edge 40, and a second opacity at the second edge 42. In the example of FIG. 7B, the second opacity is less than the first opacity.

Notably, since the organic ink OI is digitally applied at 400 dots per inch or greater, in some examples, the organic ink OI is digitally applied to form significantly more detailed features than conventional analog printing to affect the opacity of the opaque boundary feature 26. For example, the organic ink OI may be applied with nearly full coverage at the first edge 40 such that the first opacity of the opaque boundary feature 26 is less than 1% transmission of visible light, and the organic ink OI may be applied with less than full coverage at the second edge 42 such that the second opacity of the opaque boundary feature 26 is greater than 1% transmission of visible light. Accordingly, in some configurations, the first opacity may be less than 1% transmission of visible light, or even less than 0.1% transmission of visible light, and the second opacity may be greater than 99% transmission of visible light, or greater than 99.9% transmission of visible light. It is contemplated that the first opacity and the second opacity may be independently selected from any values between 0.1% transmission of visible light and 99.9% transmission of visible light. Additionally, any suitable transition between the first opacity and the second opacity is contemplated including, but not limited to, a smooth transition between the first opacity and the second opacity (e.g. to form a gradient pattern), or a stepwise transition between the first opacity and the second opacity.

As described above, bands formed around a peripheral edge of a glass assembly are conventionally black in color. However, in the present disclosure, it is contemplated that the pigment of the organic ink OI may be any color, enabling more freedom of design choice in designing the glass assembly 20 including the opaque boundary feature 26. While the band 36 illustrated in FIGS. 7A-8C is black, it is contemplated that the opaque boundary feature 26 may be formed to have any color such as black, shades of grey, white, any primary color, or combinations thereof.

Referring now to FIGS. 7A-9B, in some examples, the opaque boundary feature 26 includes an optical sensor boundary 44 arranged adjacent to the peripheral edge 38 of the glass assembly 20. Particularly, the optical sensor boundary 44 may be arranged on or near the peripheral edge 38 of the glass assembly 20. Any suitable location of the optical sensor boundary 44 that does not obscure the vision of the driver of the vehicle 18 is contemplated. The optical sensor boundary 44 may define a sensing window 46 that is aligned with a field of view FOV of an optical sensor 48 that is mounted to the glass assembly 20. It should be appreciated that the optical sensor may be mounted to the glass assembly 20 in any suitable manner. For example, FIGS. 8A-8C show a cross-sectional schematic representation of examples of the optical sensor 48 mounted to the glass assembly 20 on the P4 surface. Referring to FIG. 8A, in some examples, the optical sensor boundary 44 may be formed on only the P2 surface of the glass assembly 20. Referring to FIG. 8B, in some examples, the optical sensor boundary 44 is formed on only the P3 surface of the glass assembly 20. Referring to FIG. 8C, in some examples, the optical sensor boundary 44 is formed on both the P2 surface and the P3 surface of the glass assembly 20.

Figure 9A:
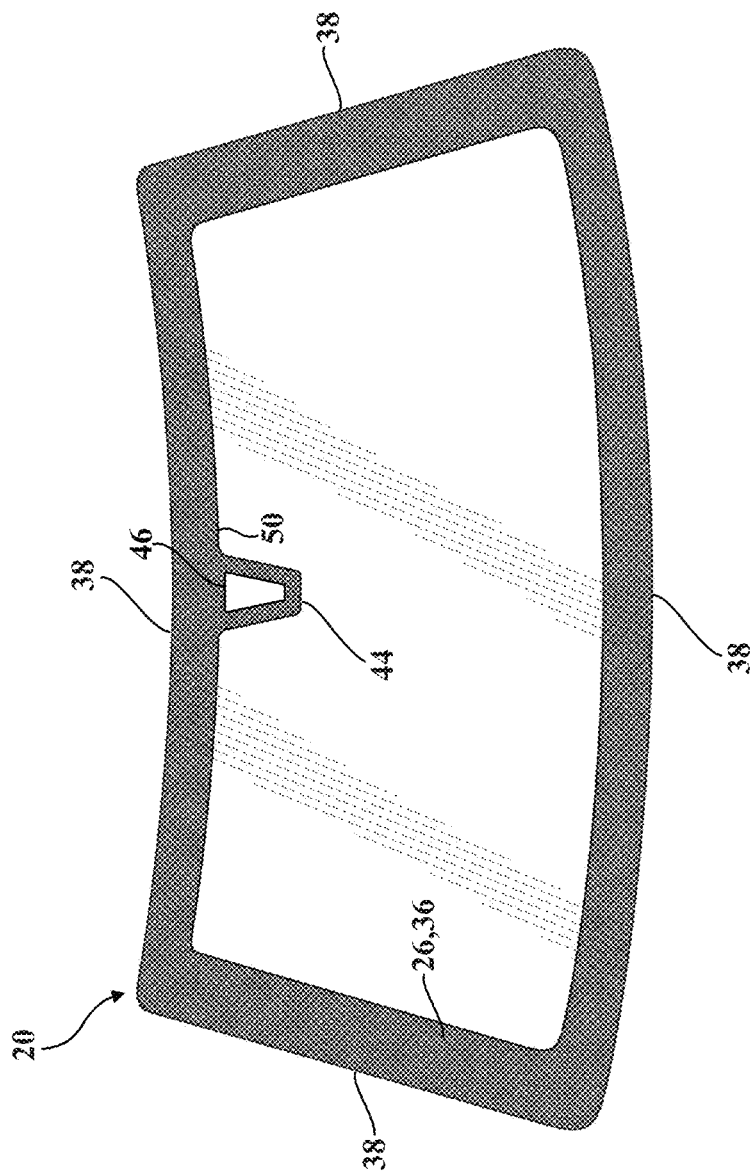
FIG. 9A is a front view of a glass assembly including an opaque boundary feature formed as a band and an optical sensor boundary defining a sensing window, where the sensing window is transparent to visible light.
Figure 9B:
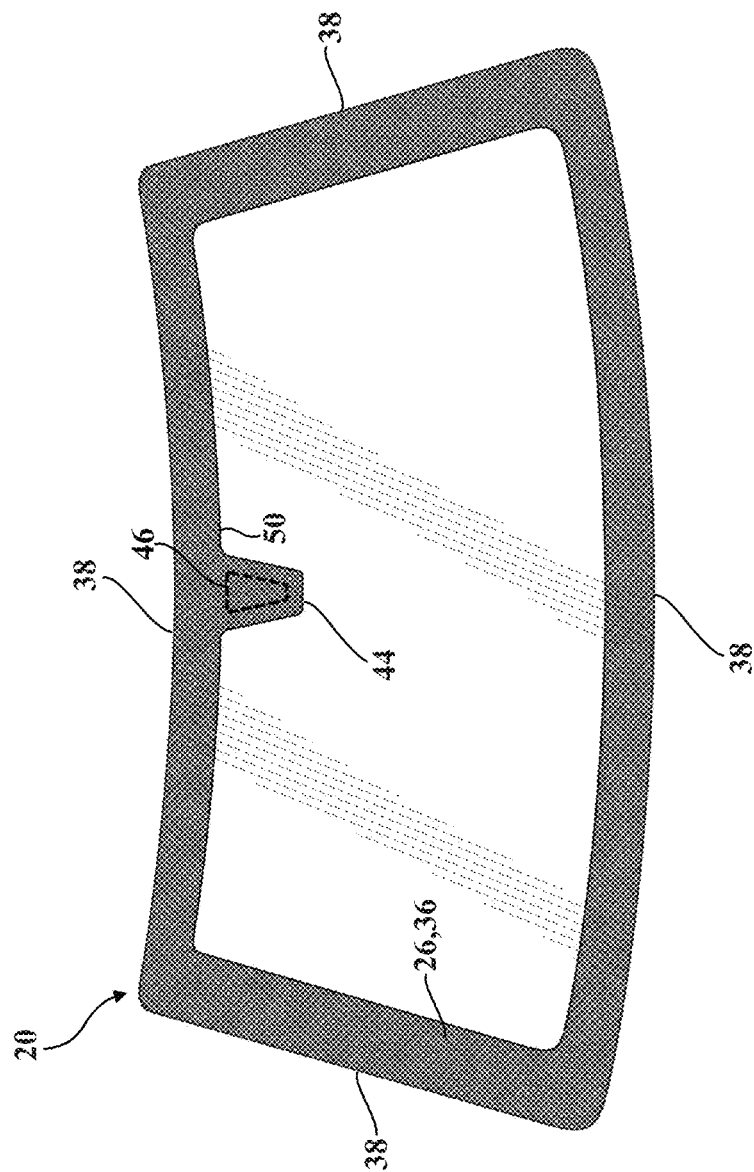
FIG. 9B is a front view of a glass assembly including an opaque boundary feature formed as a band and an optical sensor boundary defining a sensing window, where the sensing window is opaque to visible light and transparent to infrared light.

FIGS. 9A and 9B each show a front view of one example of a glass assembly 20 formed according to the method 100. In these examples, the opaque boundary feature 26 of the glass assembly 20 includes the band 36 extending around the entirety of a peripheral edge 38 of the glass assembly 20, as well as an optical sensor boundary 44 extending downward from a top inner edge of the band 36 to surround the field of view FOV of the optical sensor 48 to define the sensing window 46. However, it is contemplated that the band 36 and the optical sensor boundary 44 may not abut each other in all configurations. For example, the optical sensor boundary 44 may be spaced from the band 36. Additionally, in other configurations, the glass assembly 20 may only include an opaque boundary feature 26 defining the band 36. In further configurations, the glass assembly 20 may only include an opaque boundary feature 26 defining the optical sensor boundary 44.

Referring to the examples illustrated in FIGS. 8A-8C and 9A, the optical sensor boundary 44 defines a sensing window 46 that is free of the organic ink OI and therefore transparent to visible light. Notably, it is important that the sensing window 46 be transparent to visible light where the optical sensor 48 is a camera so that the camera can "see" through the sensing window 46. However, when the optical sensor 48 is a LIDAR sensor, the sensing window 46 is transparent to infrared light. Accordingly, in some configurations, an organic ink OI may be selected that is transparent to infrared light but opaque to visible light. Thus, referring to FIG. 9B, in some configurations, the optical sensor boundary 44 may include a sensing window 46 where organic ink OI is deposited such that the sensing window 46 is opaque to visible light. However, in this example, since the organic ink OI is transparent to infrared light, the LIDAR sensor will still "see" through the sensing window 46.

As described above, opaque boundary features formed using a conventional enamel including ceramic frit tend to exhibit significant optical distortion, which is particularly detrimental to the performance of optical sensors when the distortion is within the field of view of the optical sensor. Thus, in some examples, the entire glass assembly 20 including the opaque boundary feature 26 formed by the method 100 may be free of ceramic frit, and thus not subject to firing after printing, thereby substantially reducing the optical distortion of the glass assembly 20. Accordingly, the optical distortion of the glass assembly 20 is low enough to meet specifications required for optimal performance of optical sensors 48, such as a camera or a LIDAR sensor, as well as optical projecting devices, such as a heads-updisplay. For example, a glass assembly 20 formed according to the method 100 may exhibit an optical distortion of less than 100 millidiopters within the sensing window 46.

Figure 9C:
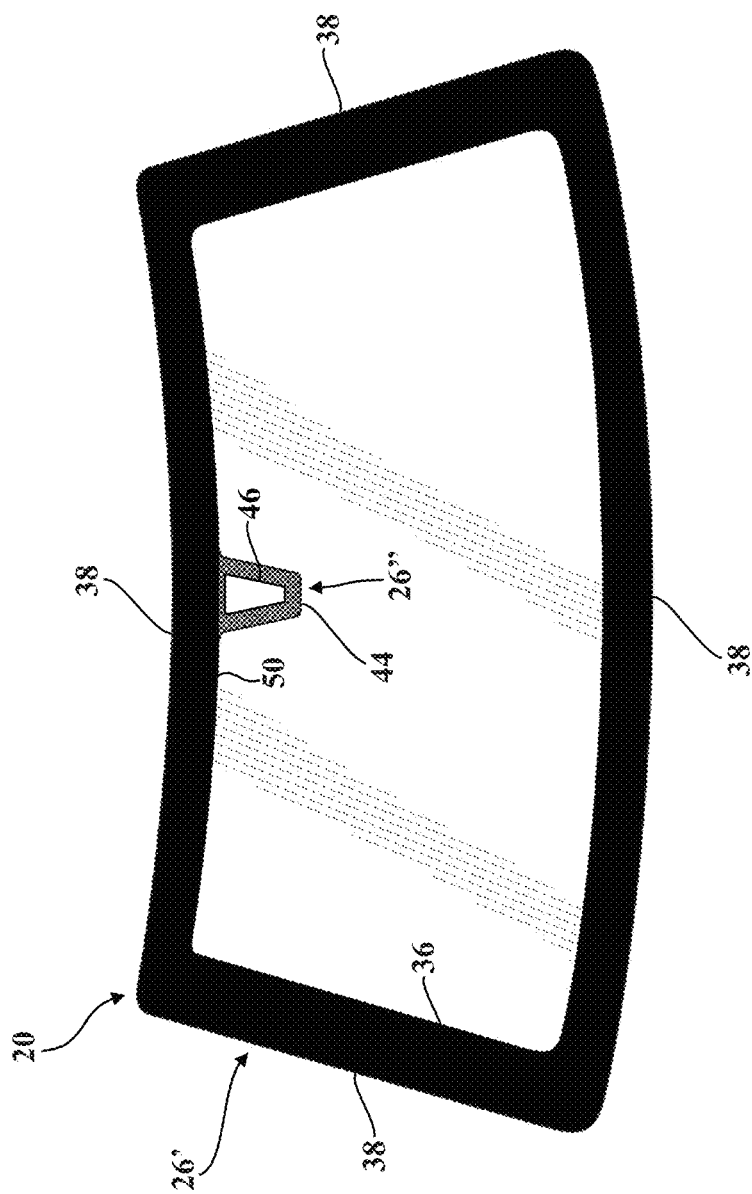
FIG. 9C is a front view of a glass assembly including an opaque boundary feature including a first portion formed from an enamel including ceramic frit and a second portion formed from organic ink.

However, in other examples, the opaque boundary feature 26 may be partially formed from enamel including ceramic frit that is subject to firing. Referring to FIG. 9C, the glass assembly 20 may include a first portion 26' of the opaque boundary feature 26 that is formed by applying and subsequently firing an enamel including ceramic frit on a surface of at least one of the first curved glass substrate 22 and/or the second curved glass substrate 24. The glass assembly may further include a second portion 26" that is formed by digitally-applying and curing the organic ink OI. In the illustrated example, the first portion 26' defines the band 36 extending around the entirety of a peripheral edge 38 of the glass assembly 20, and the second portion 26" defines the optical sensor boundary 44 arranged adjacent to the peripheral edge 38 of the glass assembly 20 and defining the sensing window 46. Advantageously, because the optical sensor boundary 44 is formed according to the method 100, the optical distortion of the glass assembly within the sensing window 46 is low enough to meet specifications required for optimal performance of optical sensors 48. More specifically, since the sensing window 46 is spaced from the first portion 26' in this example, the optical distortion caused by firing the glass assembly 20 to form the first portion 26' will not affect the portion of the glass assembly 20 that is aligned with the sensing window 46. Accordingly, the glass assembly 20 of the present example may exhibit an optical distortion of less than 100 millidiopters within the sensing window 46. Forming the first portion 26' from enamel including ceramic frit in portions of the glass assembly 20 where optical distortion is not critical and forming the second portion 26" from the organic ink OI in portions of the glass assembly 20 where optical distortion is critical may reduce the process time of forming the glass assembly 20 as compared to forming the entire opaque boundary feature 26 according to the method 100. It is contemplated that the first portion 26' and the second portion 26" may be any individual portions of the opaque boundary feature 26.

Figure 10A:
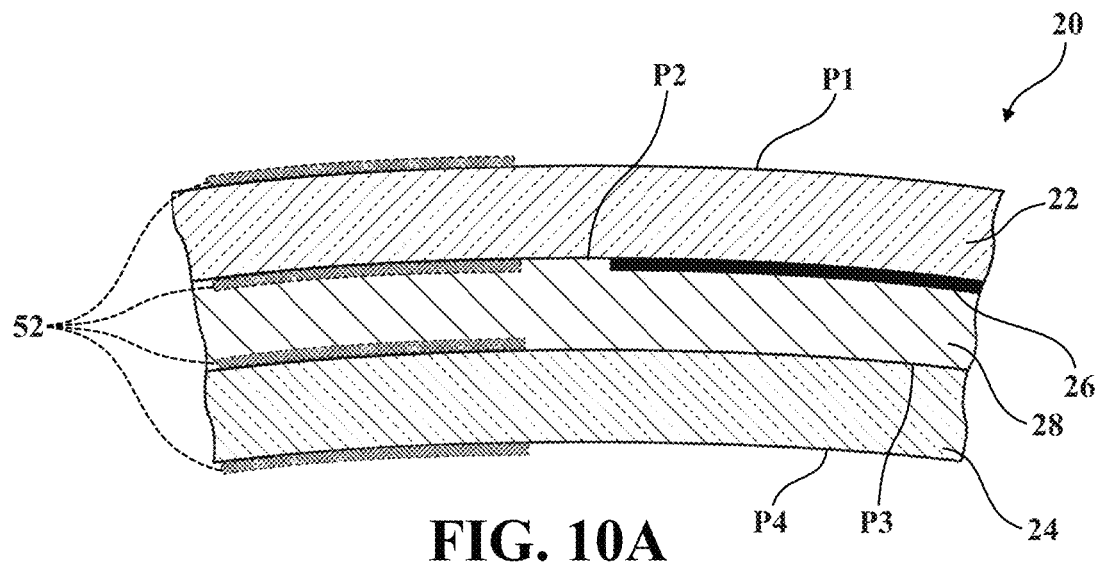
FIGS. 10A-10B are cross-sectional schematic representations of examples of the glass assembly of FIG. 2 taken along line 10-10 including an opaque boundary feature and an information containing graphic.
Figure 10B:
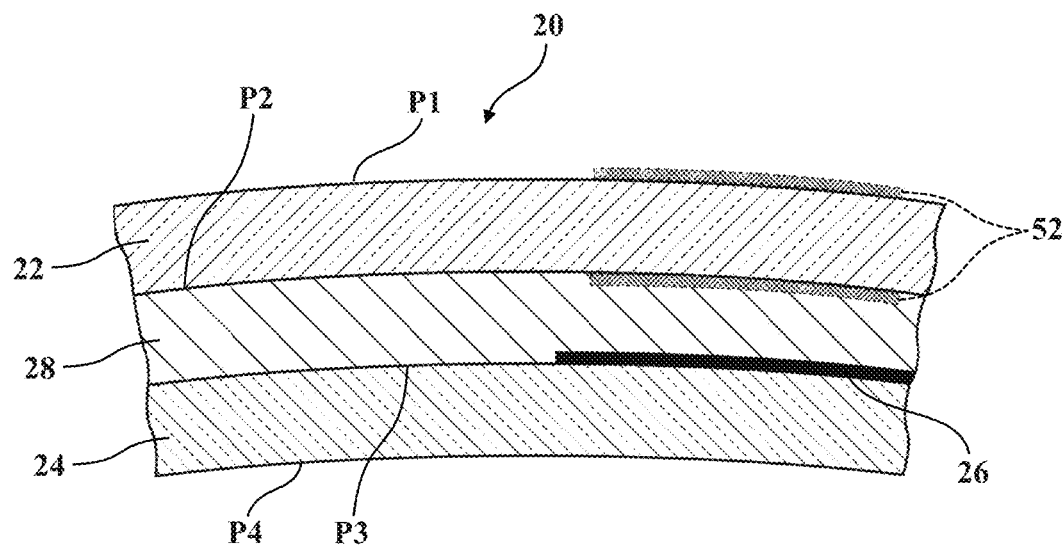

Additionally, in some configurations, the method 100 further comprises digitally-applying an ink to form an information-containing graphic 52 on at least one of the P1 surface, the P2 surface, the P3 surface, and the P4 surface of the glass assembly 20. FIGS. 10A and 10B show schematic representations of some examples of arrangements of the information-containing graphic 52. For example, FIG. 10A illustrates potential arrangements of the information-containing graphic 52 on the glass assembly 20 where the information-containing graphic 52 is spaced from the opaque boundary feature 26, with each of the potential arrangements of the information-containing graphic 52 defined by phantom lines. On the other hand, FIG. 10B illustrates potential arrangements of the information-containing graphic 52 where the information-containing graphic 52 is aligned with the opaque boundary feature 26, with each of the potential arrangements of the information-containing graphic 52 defined by phantom lines. It is contemplated that the information-containing graphic 52 may be arranged on any suitable location or surface of the glass assembly 20 to convey the desired information. Additionally, it is contemplated that the ink for the information-containing graphic 52 can be the same as or different from the organic ink M.

Figure 11A:
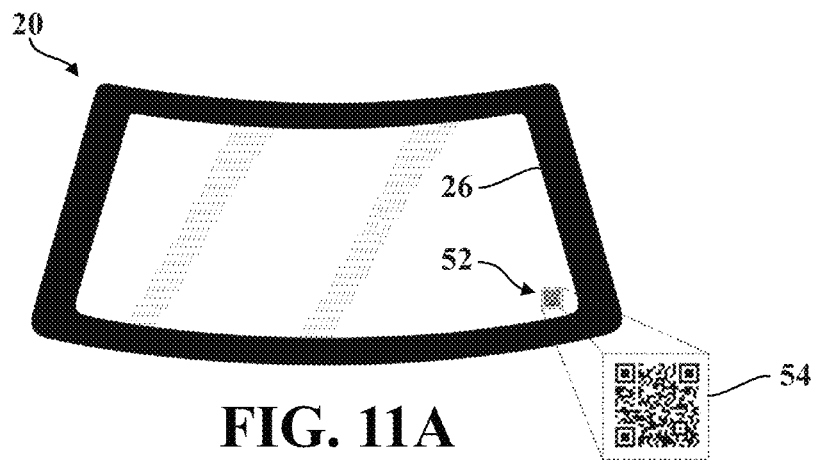
FIGS. 11A-11C are front views of examples of a glass assembly including an opaque boundary feature and an information containing graphic.
Figure 11B:
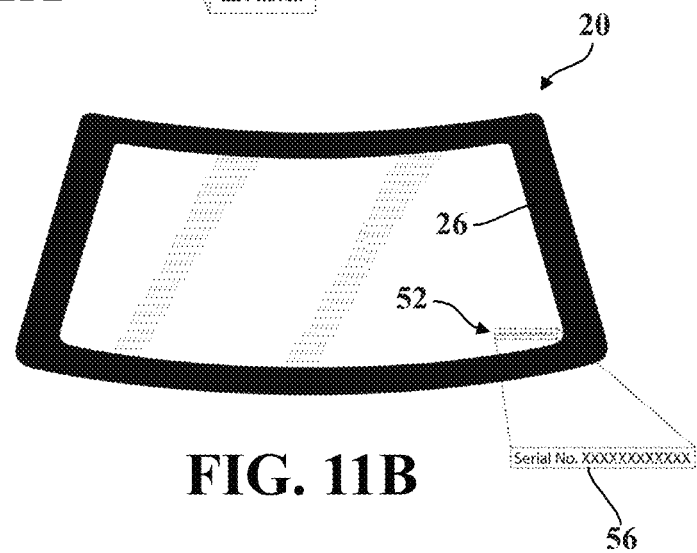
Figure 11C:
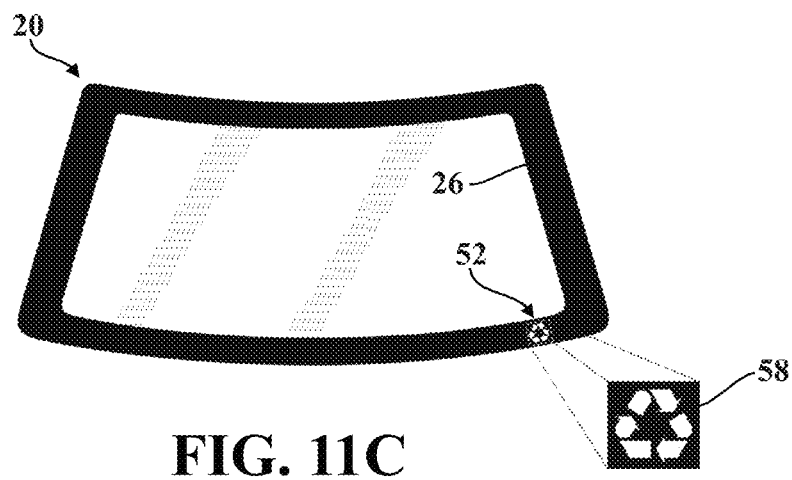

FIGS. 11A-11C show non-limiting examples of the information-containing graphic 52. For example, FIG. 11A shows the information-containing graphic 52 as a barcode 54. It is contemplated that the barcode 54 may be a conventional barcode or a QR code. In another example, FIG. 11B shows the information-containing graphic 52 as a serial number 56. It is contemplated that the serial number 56 may be a serial number relating to the batch or individual serial number of the glass assembly, or the VIN number of a vehicle. FIG. 11C shows the information-containing graphic 52 as a graphic 58. It is contemplated that the graphic 58 may be formed as any desired design for decorative or informational purposes. As non-limiting examples, the graphic 58 may include manufacturer logos or governmentally required information (such as information required by FMVSS 205). Notably, FIGS. 11A and 11B illustrate examples of the information-containing graphic 52 spaced from the opaque boundary feature, while FIG. 11C illustrates an example of the information-containing graphic 52 aligned with the opaque boundary feature 26.

Several embodiments have been described in the foregoing description. However, the embodiments described herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular. It will be further appreciated that the terms "include," "includes," and "including" have the same meaning as the terms "comprise," "comprises," and "comprising."

What is claimed is:

1. A method of manufacturing a glass assembly to have an opaque boundary feature, said method comprising:
    forming a first glass substrate that is curved, with the first glass substrate having an outer surface (P1) and an opposing inner surface (P2), and a second glass substrate that is curved, with the second glass substrate having an inner surface (P3) and an opposing outer surface (P4);
    digitally-applying an organic ink without a mask on at least one of the P2 surface of the first curved glass substrate and the P3 surface of the second curved glass substrate;
    curing the organic ink to form the opaque boundary feature on at least one of the P2 surface of the first curved glass substrate and the P3 surface of the second curved glass substrate, wherein the opaque boundary feature has a resolution of greater than 200 dots per inch; and disposing a polymeric interlayer between the P2 surface of the first glass substrate and the P3 surface of the second glass substrate.

2. The method of claim 1, wherein the opaque boundary feature includes an optical sensor boundary arranged adjacent to a peripheral edge of the glass assembly, the optical sensor boundary defining a sensing window that is aligned with a field of view of an optical sensor mounted to the glass assembly.

3. The method of claim 2, wherein:
the opaque boundary feature further includes a band extending around an entirety of the peripheral edge of the glass assembly; and
the optical sensor boundary extends downward from a top inner edge of the band and surrounds the field of view of the optical sensor to define the sensing window.

4. The method of claim 2, wherein the glass assembly exhibits an optical distortion of less than 100 millidiopters within the sensing window.

5. The method of claim 1, wherein the opaque boundary feature is formed as a band extending around the entirety of a peripheral edge of the glass assembly.

6. The method of claim 5, wherein the glass assembly is free of ceramic frit.

7. The method of claim 1, further comprising:
forming a first portion of the opaque boundary feature by applying an enamel including ceramic frit onto a surface of at least one of the first curved glass substrate and the second curved glass substrate, and firing at least one of the first curved glass substrate and the second curved glass substrate including the enamel to fuse the enamel into the at least one of the first curved glass substrate and the second curved glass substrate to form the first portion of the opaque boundary feature; and
forming a second portion of the opaque boundary feature by digitally-applying the organic ink without a mask on at least one of the P2 surface of the first curved glass substrate and the P3 surface of the second curved glass substrate, and curing the organic ink to form the second portion of the opaque boundary feature on at least one of the P2 surface of the first curved glass substrate and the P3 surface of the second curved glass substrate.

8. The method of claim 1, wherein the opaque boundary feature has an opacity that is uniform throughout the entire opaque boundary feature.

9. The method of claim 1, wherein the opaque boundary feature has a first edge and a second edge opposite the first edge, wherein the opaque boundary feature has a first opacity at the first edge and a second opacity at the second edge, and wherein the second opacity is less than the first opacity.

10. The method of claim 1, wherein said step of digitally-applying the organic ink comprises inkjet-printing the organic ink on at least one of the P2 surface and the P3 surface.

11. The method of claim 1, wherein the organic ink has a thermal degradation temperature, and wherein said step of curing the organic ink to form the opaque boundary feature occurs below the thermal degradation temperature of the organic ink.

12. The method of claim 1, wherein said step of curing the organic ink to form the opaque boundary feature comprises photo-curing the organic ink with a UV curing device.

13. The method of claim 12, wherein the organic ink includes a photoinitiator and an organic monomer; and
wherein said step of curing the organic ink to form the opaque boundary feature comprises exposing the organic ink to the UV curing device to activate the photoinitiator to initiate polymerization of the organic monomer to cure the organic ink.

14. The method of claim 1, wherein said step of curing the organic ink is initiated within 5 seconds after said step of digitally-applying the organic ink.

15. The method of claim 1, further comprising providing a robotic applicator including a printhead and a UV curing device, and positioning the robotic applicator adjacent to at least one of the P2 surface and the P3 surface;
wherein said step of digitally-applying the organic ink comprises digitally-applying the organic ink from the printhead of the robotic applicator without a mask on at least one of the P2 surface and the P3 surface as the robotic applicator moves the printhead along at least one of the P2 surface and the P3 surface; and
wherein said step of curing the organic ink to form the opaque boundary feature comprises activating the UV curing device of the robotic applicator to photo-cure the digitally applied organic ink as the robotic applicator moves along at least one of the P2 surface and the P3 surface.

16. The method of claim 1, wherein the opaque boundary feature has a thickness of less than 15 micrometers on at least one of the P2 surface and the P3 surface.

17. The method of claim 1, wherein said step of digitally-applying the organic ink further comprises digitally-applying the organic ink at a resolution of greater than 400 dots per inch.

18. The method of claim 1, further comprising digitally-applying an ink to form an information-containing graphic on at least one of the P1 surface, the P2 surface, the P3 surface, and the P4 surface, wherein the ink can be the same as or different from the organic ink.

19. A method of manufacturing a glass assembly to have an opaque boundary feature, said method comprising:
forming a first glass substrate that is curved, with the first glass substrate having an outer surface (P1) and an opposing inner surface (P2), and a second glass substrate that is curved, with the second glass substrate having an inner surface (P3) and an opposing outer surface (P4);
forming a first portion of the opaque boundary feature by applying an enamel including ceramic frit onto a surface of at least one of the first curved glass substrate and the second curved glass substrate, and firing at least one of the first curved glass substrate and the second curved glass substrate including the enamel to fuse the enamel into the at least one of the first curved glass substrate and the second curved glass substrate to form the first portion of the opaque boundary feature;
forming a second portion of the opaque boundary feature by digitally-applying an organic ink without a mask on at least one of the P2 surface of the first curved glass substrate and the P3 surface of the second curved glass substrate;
curing the organic ink to form the second portion of the opaque boundary feature on at least one of the P2 surface of the first curved glass substrate and the P3 surface of the second curved glass substrate; and
disposing a polymeric interlayer between the P2 surface of the first glass substrate and the P3 surface of the second glass substrate.

20. The method of claim 19, wherein the second portion of the opaque boundary feature includes an optical sensor boundary arranged adjacent to a peripheral edge of the glass assembly, the optical sensor boundary defining a sensing window that is aligned with a field of view of an optical sensor mounted to the glass assembly.

21. The method of claim 20, wherein:
the first portion of the opaque boundary feature further includes a band extending around an entirety of the peripheral edge of the glass assembly; and
the optical sensor boundary extends downward from a top inner edge of the band and surrounds the field of view of the optical sensor to define the sensing window.

22. The method of claim 20, wherein the glass assembly exhibits an optical distortion of less than 100 millidiopters within the sensing window.

23. The method of claim 19, wherein said step of curing the organic ink to form the opaque boundary feature comprises photo-curing the organic ink with a UV curing device.

24. A method of manufacturing a glass assembly to have an opaque boundary feature, said method comprising:
forming a first glass substrate that is curved, with the first glass substrate having an outer surface (P1) and an opposing inner surface (P2), and a second glass substrate that is curved, with the second glass substrate having an inner surface (P3) and an opposing outer surface (P4);
digitally-applying an organic ink without a mask on at least one of the P2 surface of the first curved glass substrate and the P3 surface of the second curved glass substrate;
curing the organic ink to form the opaque boundary feature on at least one of the P2 surface of the first curved glass substrate and the P3 surface of the second curved glass substrate, wherein the opaque boundary feature has a first edge and a second edge opposite the first edge, wherein the opaque boundary feature has a first opacity at the first edge and a second opacity at the second edge, and wherein the second opacity is less than the first opacity; and
disposing a polymeric interlayer between the P2 surface of the first glass substrate and the P3 surface of the second glass substrate.

25. The method of claim 24, wherein the opaque boundary feature has a resolution of greater than 200 dots per inch.

26. The method of claim 24, wherein the opaque boundary feature is formed as a band extending around the entirety of a peripheral edge of the glass assembly.

27. The method of claim 24, wherein the opaque boundary feature includes an optical sensor boundary arranged adjacent to a peripheral edge of the glass assembly, the optical sensor boundary defining a sensing window that is aligned with a field of view of an optical sensor mounted to the glass assembly.

* * * * *